US009343909B2

(12) United States Patent
Tsuda et al.

(10) Patent No.: US 9,343,909 B2
(45) Date of Patent: May 17, 2016

(54) WIRELESS POWER TRANSMISSION DEVICE AND METHOD FOR CONTROLLING POWER SUPPLY FOR WIRELESS POWER TRANSMISSION DEVICE

(71) Applicant: NITTO DENKO CORPORATION, Ibaraki-shi, Osaka (JP)

(72) Inventors: Hisashi Tsuda, Ibaraki (JP); Takezo Hatanaka, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/424,636

(22) PCT Filed: Jun. 6, 2014

(86) PCT No.: PCT/JP2014/065126
§ 371 (c)(1),
(2) Date: Feb. 27, 2015

(87) PCT Pub. No.: WO2015/015901
PCT Pub. Date: Feb. 5, 2015

(65) Prior Publication Data
US 2015/0263530 A1    Sep. 17, 2015

(30) Foreign Application Priority Data
Jul. 29, 2013  (JP) .................................. 2013-156331

(51) Int. Cl.
*H02J 17/00*   (2006.01)
*H02J 5/00*    (2016.01)
*H02J 7/02*    (2016.01)
(52) U.S. Cl.
CPC ................. *H02J 5/005* (2013.01); *H02J 7/025* (2013.01); *H02J 17/00* (2013.01)

(58) Field of Classification Search
CPC ........................................................ H02J 17/00
USPC ........................................................ 307/104
See application file for complete search history.

(56) References Cited

U.S. PATENT DOCUMENTS

2010/0244580 A1   9/2010  Uchida et al.
2011/0127846 A1   6/2011  Urano
(Continued)

FOREIGN PATENT DOCUMENTS

CN    102082469 A    6/2011
CN    102195366 A    9/2011
(Continued)

OTHER PUBLICATIONS

Jul. 29, 2014 Search Report issued in International Application No. PCT/JP2014/065126.
(Continued)

*Primary Examiner* — Jared Fureman
*Assistant Examiner* — Daniel Kessie
(74) *Attorney, Agent, or Firm* — Oliff PLC

(57) ABSTRACT

A wireless power transmission apparatus 1 includes a power-supplying module 2, a power-receiving module 3, a phase detector 4, and a control device 5, and is set so that its transmission characteristic with respect to the power-source frequency has a double-hump characteristic. The control device 5 determines whether to supply power to the power-supplying module 2, based on variation in the phase of the input impedance $Z_{in}$ in the power-supplying state and that in the standby state, which is detected by a phase detector 4.

4 Claims, 14 Drawing Sheets

(56) References Cited

U.S. PATENT DOCUMENTS

| | | | |
|---|---|---|---|
| 2011/0227420 A1 | 9/2011 | Urano | |
| 2011/0316348 A1* | 12/2011 | Kai | H02J 17/00 307/104 |
| 2012/0001494 A1 | 1/2012 | Urano | |
| 2012/0098348 A1 | 4/2012 | Inoue et al. | |
| 2012/0146424 A1 | 6/2012 | Urano | |
| 2012/0242285 A1 | 9/2012 | Jung et al. | |
| 2013/0154386 A1* | 6/2013 | Bae | H02J 17/00 307/104 |
| 2014/0225452 A1 | 8/2014 | Kozaki et al. | |
| 2014/0300202 A1 | 10/2014 | Shimokawa | |

FOREIGN PATENT DOCUMENTS

| | | |
|---|---|---|
| CN | 102396131 A | 3/2012 |
| CN | 102694423 A | 9/2012 |
| CN | 103166328 A | 6/2013 |
| JP | 2010-239769 A | 10/2010 |
| JP | 2010-252446 | 10/2010 |
| JP | 4624768 B2 | 2/2011 |
| JP | 2013-062895 A | 4/2013 |
| JP | 2013-128399 A | 6/2013 |
| WO | 2013/038617 A1 | 3/2013 |
| WO | 2013/062895 A1 | 5/2013 |
| WO | 2013/098975 A1 | 7/2013 |

OTHER PUBLICATIONS

Nov. 4, 2015 Office Action issued in Chinese Application No. 201480002540.1.

Mar. 22, 2016 Search Report issued in European Appl. No. 14831442.0.

* cited by examiner (COMPARATIVE EXAMPLE 1: SINGLE-HUMP)

(EXAMPLE 1: DOUBLE-HUMP)

(COMPARATIVE EXAMPLE 2: $k_{12}=k_{23}$, $f1=f0$)

(EXAMPLE 2: $k_{12} \neq k_{23}$, $f1=f0$)

(EXAMPLE 3: $k_{12} \neq k_{23}$, $f1 \neq f0$)

( EXAMPLE 4: $k_{12} = k_{23}$, $f1 \neq f0$ )

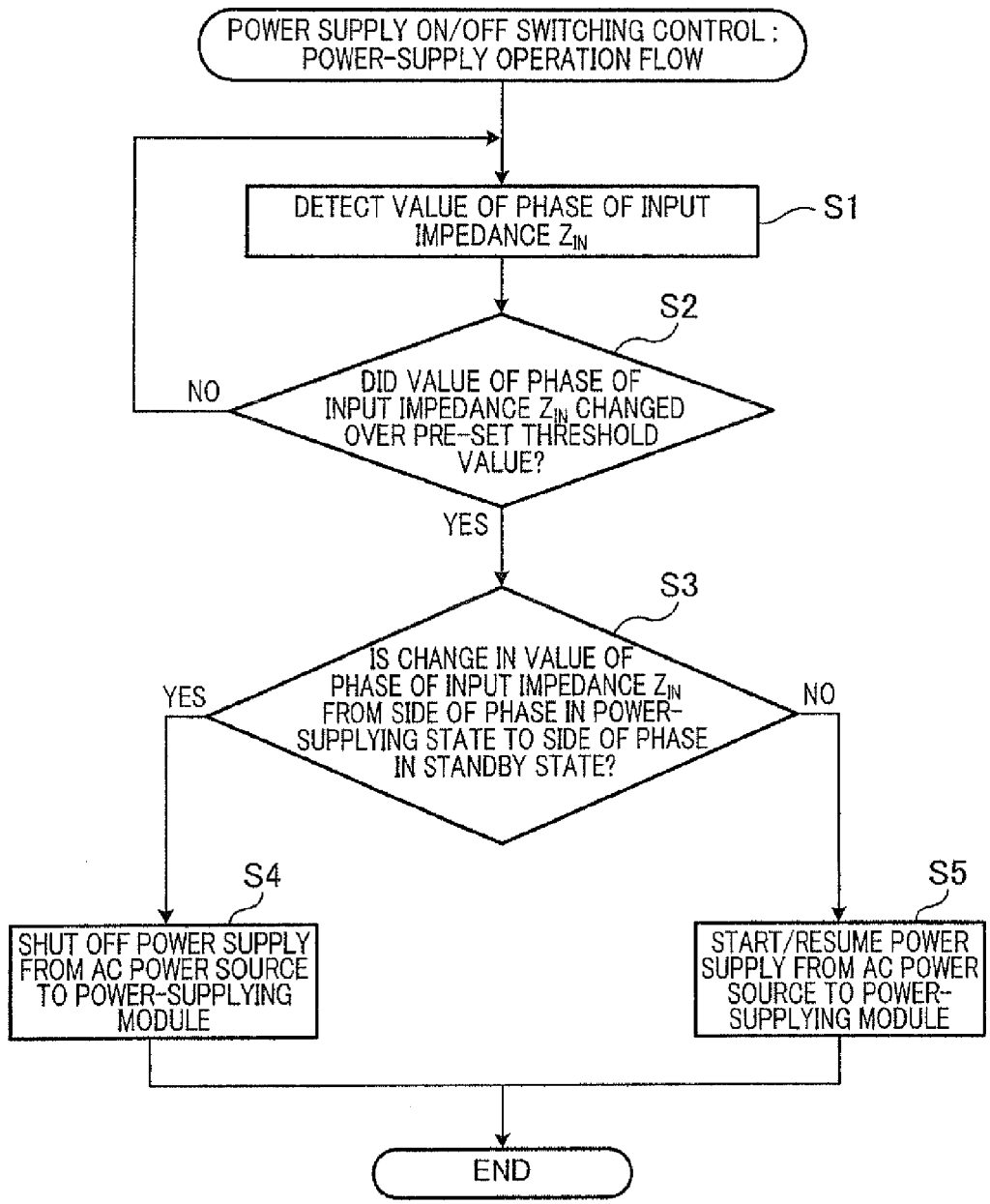

WIRELESS POWER TRANSMISSION DEVICE AND METHOD FOR CONTROLLING POWER SUPPLY FOR WIRELESS POWER TRANSMISSION DEVICE

TECHNICAL FIELD

The present invention relates to a wireless power transmission apparatus configured to supply power from a power-supplying module connected to a power source to a power-receiving module by means of resonance phenomenon, and relates to a supply power control method for such a wireless power transmission apparatus.

BACKGROUND ART

Portable electronic devices such as laptop PCs, tablet PCs, digital cameras, mobile phones, portable gaming devices, earphone-type music players, wireless headsets, hearing aids, recorders, which are portable while being used by the user are rapidly increasing in recent years. Many of these portable electronic devices have therein a rechargeable battery, which requires periodical charging. To facilitate the work for charging the rechargeable battery of an electronic device, there are an increasing number of devices for charging rechargeable batteries by using a power-supplying technology (wireless power transmission technology performing power transmission by varying the magnetic field) that performs wireless power transmission between a power-supplying module and a power-receiving module mounted in an electronic device.

As a wireless power transmission technology, there have been known, for example, a technology that performs power transmission by means of electromagnetic induction between coils (e.g. see PTL 1), a technology that performs power transmission by means of resonance phenomenon (magnetic field resonant state) between resonators (coils) provided to the power-supplying device (power-supplying module) and the power-receiving device (power-receiving module) (e.g. see PTL 2).

For example, to perform wireless power transmission by coupling magnetic fields utilizing resonance phenomenon (magnetic field resonant state) between the resonators (coils) of the power-supplying module and the power-receiving module, the power-receiving module needs to be brought close to the power-supplying module so that they are within a distance (power-suppliable region) that enables power supplying from the power-supplying module to the power-receiving module. In this process of use, there is a problem that power is continuously supplied to the power-supplying module, even if the power-supplying module and the power-receiving module are not within the power-suppliable region, so as to prepare for placement of the power-receiving module within the power-suppliable region, i.e., power is wasted (there will be a large amount of power consumed for standing-by).

A suggested measure to address this issue is to provide the power-receiving module or the power-supplying module with a detector (sensor and the like) to detect changes caused by arranging the power-supplying module and the power-receiving module within the power-suppliable region, and to start supplying power to the power-supplying module using the detection result from the detector as a trigger.

For example, PTL 3 describes a power supply system having a structure in which a detector (current/voltage detector 113) is provided to a power-supplying device (power-supplying module) of a power-supplying system, an impedance is derived based on the value of current/voltage measured by the detector, and variation in this impedance (an amount of increase in the impedance and the like: see paragraph [0047] and the like) is compared with a pre-set threshold value to determine whether the power-supplying device (power-supplying module) and a secondary end device (power-receiving module) are within the power-suppliable region.

With the provision of the detector to determine whether the power-supplying module and the power-receiving module are within the power-suppliable region, it is surely possible to prevent wasteful power consumption by stopping power supply to the power-supplying module, when the power-supplying module and the power-receiving module are determined as not to be within the power-suppliable region.

CITATION LIST

Patent Literature

[PTL 1] Japanese patent No. 4624768
[PTL 2] Japanese Unexamined Paten Publication No. 239769/2010
[PTL 3] Japanese Unexamined Paten Publication No. 62895/2013

SUMMARY OF THE INVENTION

Technical Problem

However, depending on the condition settings of the power-supplying device (power-supplying module) and the secondary end device (power-receiving module), there may not be a significant variation in the impedance, which is for determining whether or not the power-supplying device (power-supplying module) and the secondary end device (power-receiving module) are within a power-suppliable region.

In view of the above problem, the present invention, focusing on the phase of an input impedance of the power-supplying module or the power-receiving module, provides a wireless power transmission apparatus configured so that the phase of the input impedance varies depending on whether a power-supplying module and a power-receiving module are within a power-suppliable region, and that enables determination of whether to conduct power supply by detecting the variation in the phase, thus preventing waste power consumption while the modules are not within the power-suppliable region.

Technical Solution

An aspect of the present invention to achieve the above object is a wireless power transmission apparatus configured to supply power from a power-supplying module connected to a power source to a power-receiving module by means of resonance phenomenon, wherein:
the power-supplying module includes
a phase detector configured to detect the phase of an input impedance, and
a control device configured to control power to be supplied to the power-supplying module;
wherein the power-supplying module and the power-receiving module are each set so that a transmission characteristic with respect to a power-source frequency of the power supplied to the power-supplying module has a double-hump characteristic such that a peak occurs in a power-source frequency band lower than a resonance frequency of the power-supplying module and the power-receiving module, and in a power-source frequency band higher than the resonance frequency; and wherein the control device determines whether to supply power to the power-supplying module, based on a difference between phases of the input impedances in a standby state and in a power-supplying state, the standby state being a state in which power is not supplied from the power-supplying module to the power-receiving module, the power-supplying state being a state in which power is supplied from the power-supplying module to the power-receiving module, and the phases being detected by the phase detector.

Traditionally, power-supplying module and the power-receiving module have been set so that the transmission characteristic of the power-supplying module and the power-receiving module has a single-hump characteristic, thus causing the peak value of the transmission characteristic to occur nearby the resonance frequency. In this case, the power transmission efficiency from the power-supplying module to the power-receiving module is maximized by setting the power-source frequency to a resonance frequency.

This setting however does not cause a difference between the phase of the input impedance in the standby state and that in the power-supplying state, since the power-source frequency is set to the resonance frequency.

For this reason, the power-supplying module and the power-receiving module are set so that the transmission characteristic of the power-supplying module and the power-receiving module has a double-hump characteristic, thus causing the peak values of the transmission characteristic to occur in a band other than the resonance frequency. This way, there is a difference between the phase of the input impedance in the standby state and that in the power-supplying state, since the power-supplying module and the power-receiving module are used with the setting of the power-source frequency nearby the peak in a band other than the resonance frequency. Further, the control device determines whether to supply power to the power-supplying module, based on the difference in the phase detected by the phase detector, which enables reduction of power consumption in the standby state.

Another aspect of the present invention is the wireless power transmission apparatus adapted so that the power-supplying module and the power-power-receiving module comprise a power-supplying coil, a power-supplying resonator, a power-receiving resonator, and a power-power-receiving coil, respectively, The power-supplying coil is constituted by an RL circuit including a resistor $R_1$ and a coil $L_1$.

The power-supplying resonator is constituted by an RLC circuit whose elements include a resistor $R_2$, a coil $L_2$, and a capacitor $C_2$.

The power-receiving resonator is constituted by an RLC circuit whose elements include a resistor $R_3$, a coil $L_3$, and a capacitor $C_3$.

The power-receiving coil is constituted by an RL circuit including a resistor $R_4$ and a coil $L_4$.

In the above structure, the power-supplying module and the power-receiving module include the power-supplying coil, the power-supplying resonator, the power-receiving resonator, and the power-receiving coil, respectively. Further, it is possible to structure the power-supplying coil and the power-receiving coil, with a relatively simple RL circuit.

Another aspect of the present invention is the wireless power transmission apparatus adapted so that the power-supplying module and the power-power-receiving module comprise a power-supplying coil, a power-supplying resonator, a power-receiving resonator, and a power-power-receiving coil, respectively, the power-supplying coil is constituted by an RLC circuit including a resistor $R_1$, a coil $L_1$, and a capacitor $C_1$, the power-supplying resonator is constituted by an RLC circuit whose elements include a resistor $R_2$, a coil $L_2$, and a capacitor $C_2$, the power-receiving resonator is constituted by an RLC circuit whose elements include a resistor $R_3$, a coil $L_3$, and a capacitor $C_3$, and the power-receiving coil is constituted by an RLC circuit whose elements include a resister $R_4$, a coil $L_4$, and a capacitor $C_4$ (however, when the power-supplying coil is an RLC serial circuit, at least one of relations $K_{12} \neq K_{23}$ and $f1 \neq f0$ is satisfied, where $K_{12}$ is a coupling coefficient between the coil $L_1$ and the coil $L_2$, $K_{23}$ is a coupling coefficient between the coil $L_2$ and the coil $L_3$, a $f1$ is a resonance frequency of the power-supplying coil, and $f0$ is a resonance frequency of the power-supplying resonator and the power-receiving resonator).

In the above structure, the power-supplying module and the power-receiving module include the power-supplying coil, the power-supplying resonator, the power-receiving resonator, and the power-receiving coil, respectively. Further, it is possible to structure the power-supplying coil and the power-receiving coil, with an RLC circuit. As described, structuring the power-supplying coil and the power-receiving coil with an RLC circuit increases the number of factors variable in designing, and achieves higher freedom in designing (variable factors for enabling the transmission characteristic of the power-supplying module and the power-receiving module having a double-hump characteristic is increased).

Further, another aspect of the present invention is a supply power control method of a wireless power transmission apparatus configured to supply power from a power-supplying module connected to a power source to a power-receiving module by means of resonance phenomenon, wherein the power-supplying module includes a phase detector configured to detect the phase of an input impedance, and a control device configured to control power to be supplied to the power-supplying module;

wherein the power-supplying module and the power-receiving module are each set so that a transmission characteristic with respect to a power-source frequency of the power supplied to the power-supplying module has a double-hump characteristic such that a peak occurs in a drive frequency band lower than a resonance frequency of the power-supplying module and the power-receiving module, and in a drive frequency band higher than the resonance frequency, the method comprising the step of the control device determining whether to supply power to the power-supplying module, based on a difference between phases of the input impedances in a standby state and in a power-supplying state, the standby state being a state in which power is not supplied from the power-supplying module to the power-receiving module, the power-supplying state being a state in which power is supplied from the power-supplying module to the power-receiving module, and the phases being detected by the phase detector.

Traditionally, power-supplying module and the power-receiving module have been set so that the transmission characteristic of the power-supplying module and the power-receiving module has a single-hump characteristic, thus causing the peak value of the transmission characteristic to occur nearby the resonance frequency. In this case, the power transmission efficiency from the power-supplying module to the power-receiving module is maximized by setting the power-source frequency to a resonance frequency.

This setting however does not cause a difference between the phase of the input impedance in the standby state and that in the power-supplying state, since the power-source frequency is set to the resonance frequency.

For this reason, with the method, the power-supplying module and the power-receiving module are set so that the transmission characteristic of the power-supplying module and the power-receiving module has a double-hump characteristic, thus causing the peak values of the transmission characteristic to occur in a band other than the resonance frequency. This way, there is a difference between the phase of the input impedance in the standby state and that in the power-supplying state, since the power-supplying module and the power-receiving module are used with the setting of the power-source frequency nearby the peak in a band other than the resonance frequency. Further, the control device determines whether to supply power to the power-supplying module, based on the difference in the phase detected by the phase detector, which enables reduction of power consumption in the standby state.

Advantageous Effects

There is provided a wireless power transmission apparatus configured so that the phase of the input impedance varies depending on whether a power-supplying module and a power-receiving module are within a power-suppliable region, and that enables determination of whether to conduct power supply by detecting the variation in the phase, thus preventing waste power consumption while the modules are not within the power-suppliable region.

DESCRIPTION OF THE DRAWINGS

FIG. 14 is a flowchart explaining a power-supply operation flow executed by the control device.

DESCRIPTION OF EMBODIMENTS

The following describes an embodiment of a wireless power transmission apparatus used in wireless power transmission, and power-supplying method for the wireless power transmission apparatus, according to the present invention.

Figure 1:
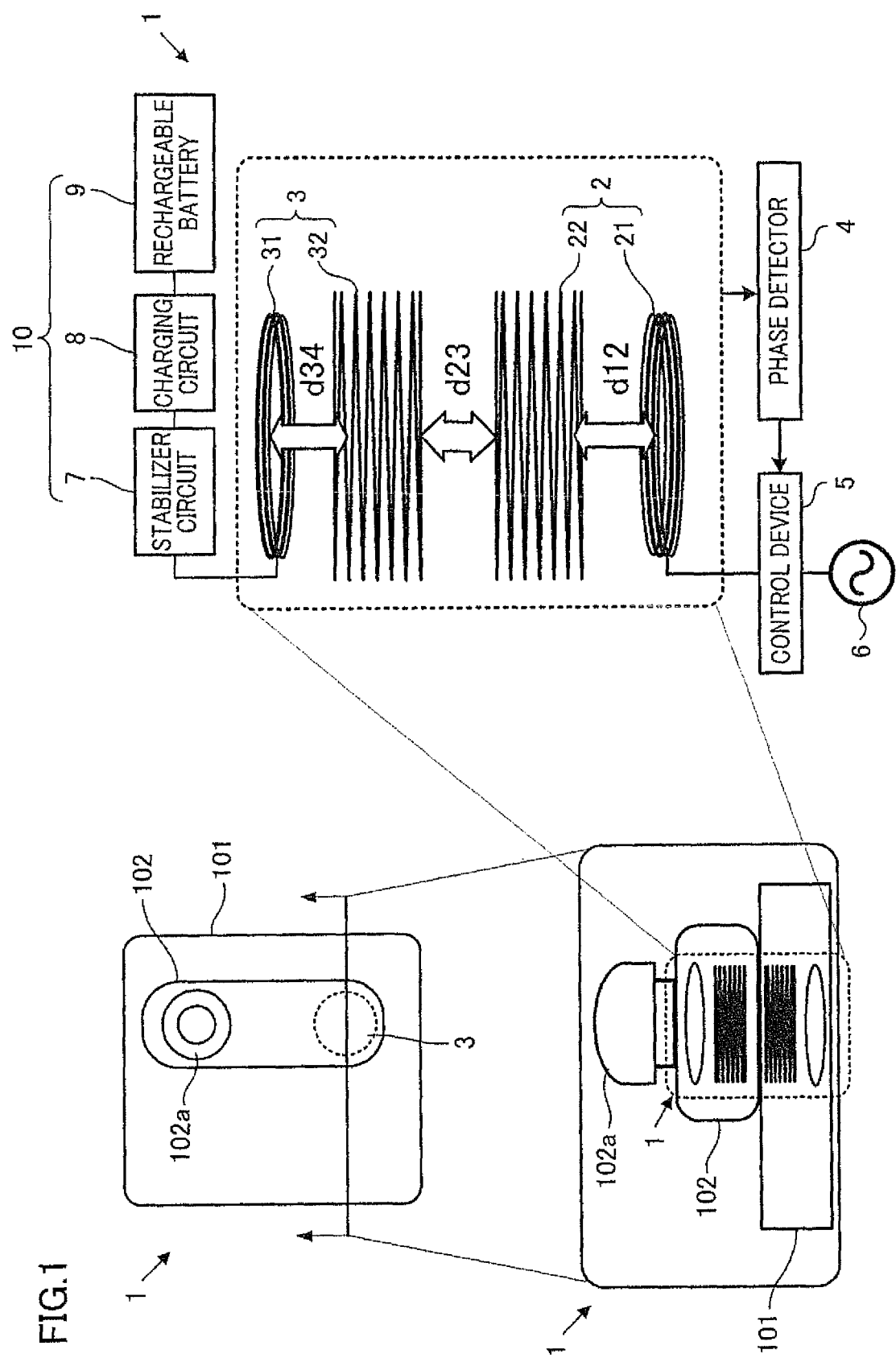
FIG. 1 is an explanatory diagram of a charger with a power-supplying module mounted therein and a wireless headset having a power-receiving module mounted therein.

As a wireless power transmission apparatus 1, the present embodiment deals with a charger 101 having a power-supplying module 2 and a wireless headset 102 having a power-receiving module 3, as shown in FIG. 1.

(Structure of Wireless Power Transmission Apparatus 1)

Figure 2:
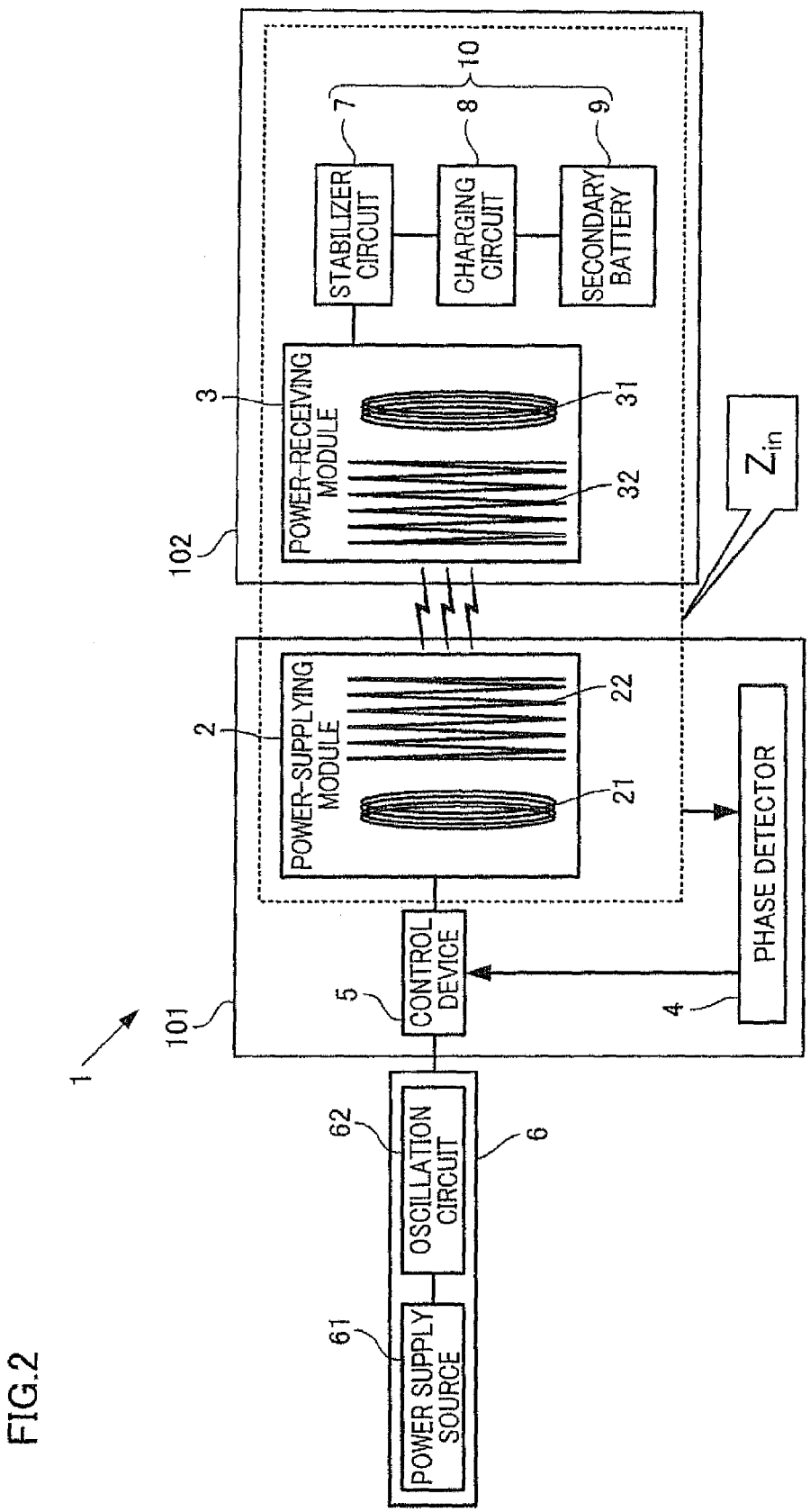
FIG. 2 is a block diagram of a wireless power transmission apparatus.

As shown in FIG. 1, the wireless power transmission apparatus 1 includes a charger 101 and a wireless headset 102. The charger 101 includes: a power-supplying module 2 having a power-supplying coil 21 and a power-supplying resonator 22, a phase detector 4, and a control device 5, as shown in FIG. 2. The wireless headset 102 includes: an earphone speaker unit 102a, a power-receiving module 3 having a power-receiving coil 31 and a power-receiving resonator 32, a stabilizer circuit 7 that rectifies an AC power received, a charging circuit 8 configured to prevent overcharges, and a secondary battery 9 (lithium ion secondary battery and the like) (parts as an audio equipment is omitted). The power-supplying module 2 is connected, via the control device 5, to an AC power source 6 (an external power supply source 61, an oscillation circuit 62) that supplies power to the power-supplying module 2. The power-receiving module 3 is connected to a secondary battery 9 via the stabilizer circuit 7 and the charging circuit 8. For the sake of convenience, the drawings illustrate the stabilizer circuit 7, the charging circuit 8, and the secondary battery 9 outside the power-receiving module 3; however, these are actually disposed on the inner circumference side of the solenoid power-receiving coil 31 and the power-receiving resonator 32. Further, as shown in FIG. 1 and FIG. 2, the stabilizer circuit 7, the charging circuit 8, and the secondary battery 9 of the present embodiment are a power-supplied electronic device 10 which is the final destination of the supplied power. The power-supplied electronic device 10 is a term collectively referring to all the devices connected to the power-receiving module 3, where the power is supplied.

The charger 101 has a not-shown accommodation groove for accommodating the wire, which has a shape corresponding to the wireless headset 102. By accommodating the wireless headset 102 to this accommodating groove of the charger 101, the wireless headset 102 is positioned in such a manner that the power-supplying module 2 of the charger 101 and the power-receiving module 3 of the wireless headset 102 face each other.

Figure 4:
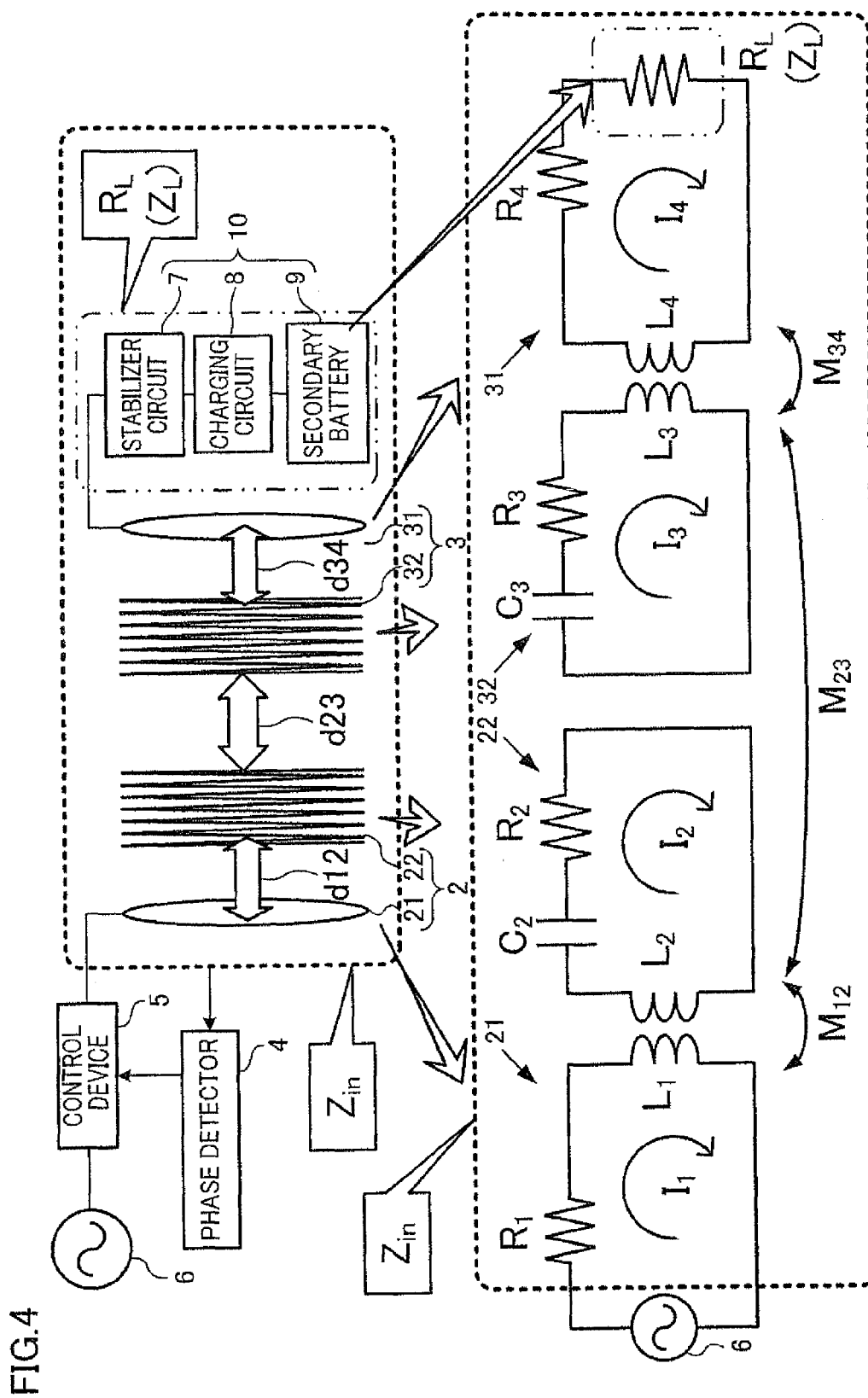
FIG. 4 is an explanatory diagram illustrating the wireless power transmission apparatus in the power-supplying state, in the form of equivalent circuit.

The power-supplying coil 21 plays a role of supplying power obtained from the AC power source 6 to the power-supplying resonator 22 by means of electromagnetic induction. As shown in FIG. 4, the power-supplying coil 21 is constituted by an RL circuit whose elements include a resistor $R_1$ and a coil $L_1$. The coil $L_1$ is formed by winding once a copper wire material (coated by an insulation film) with its coil diameter set to 15 mmφ. The total impedance of a circuit element constituting the power-supplying coil 21 is $Z_1$. In the present embodiment, the $Z_1$ is the total impedance of the RL circuit (circuit element) constituting the power-supplying coil 21, which includes the resistor $R_1$ and the coil $L_1$. Further, the current that flows in the power-supplying coil 21 is $I_1$.

The power-receiving coil 31 plays roles of receiving the power having been transmitted as a magnetic field energy from the power-supplying resonator 22 to the power-receiving resonator 32, by means of electromagnetic induction, and supplying the power received to the secondary battery 9 via the stabilizer circuit 7 and the charging circuit 8. As shown in FIG. 4, the power-receiving coil 31, similarly to the power-supplying coil 21, is constituted by an RL circuit whose elements include a resistor $R_4$ and a coil $L_4$. The coil $L_4$ is formed by winding once a copper wire material (coated by an insulation film) with its coil diameter set to 15 mmφ. The total impedance of a circuit element constituting the power-receiving coil 31 is $Z_4$. In the present embodiment, the $Z_4$ is the total impedance of the RL circuit (circuit element) constituting the power-receiving coil 31, which includes the resistor $R_4$ and the coil $L_4$. The total impedance of the power-supplied electronic device 10 (the stabilizer circuit 7, the charging circuit 8, and the secondary battery 9) connected to the power-receiving coil 31 is $Z_L$. Further, the current that flows in the power-receiving coil 31 is $I_4$. The total impedance of the power-supplied electronic device 10 expressed as $Z_L$ may be replaced with $R_L$, for the sake of convenience.

As shown in FIG. 4, the power-supplying resonator 22 is constituted by an RLC circuit whose elements include a resistor $R_2$, a coil $L_2$, and a capacitor $C_2$. Further, as shown in FIG. 4, the power-receiving resonator 32 is constituted by an RLC circuit whose elements include a resistor $R_3$, a coil $L_3$, and a capacitor $C_3$. The power-supplying resonator 22 and the power-receiving resonator 32 each serves as a resonance circuit and plays a role of creating a magnetic field resonant state. The magnetic field resonant state (resonance phenomenon) here is a phenomenon in which two or more coils resonate with each other at a resonance frequency. The total impedance of a circuit element constituting the power-supplying resonator 22 is $Z_2$. In the present embodiment, the $Z_2$ is the total impedance of the RLC circuit (circuit element) constituting the power-supplying resonator 22, which includes the resistor $R_2$, the coil $L_2$, and the capacitor $C_2$. In the present embodiment, the $Z_3$ is the total impedance of the RLC circuit (circuit element) constituting the power-receiving resonator 32, which includes the resistor $R_3$, the coil $L_3$, and the capacitor $C_3$. Further, the current that flows in the power-supplying resonator 22 is $I_2$, and the current that flows in the power-receiving resonator 32 is $I_3$.

In the RLC circuit which is the resonance circuit in each of the power-supplying resonator 22 and the power-receiving resonator 32, the resonance frequency is f which is derived from (Formula 1) below, where the inductance is L and the capacity of capacitor is C. In the present embodiment, the resonance frequency (f0) of the power-supplying resonator 22 and the power-receiving resonator 32 is set to 1 MHz $$f = \frac{1}{2\pi\sqrt{LC}} \quad \text{(Formula 1)}$$

The power-supplying resonator 22 is a solenoid coil made of a copper wire material (coated by a insulation film) with its coil diameter being 15 mmφ. The power-receiving resonator 32 is a solenoid coil made of a copper wire material (coated by an insulation film) with its coil diameter being 15 mmφ. The resonance frequency of the power-supplying resonator 22 and that of the power-receiving resonator 32 are matched with each other, as described above. The power-supplying resonator 22 and the power-receiving resonator 32 may be a spiral coil or a solenoid coil as long as it is a resonator using a coil.

In regard to the above, the distance between the power-supplying coil 21 and the power-supplying resonator 22 is denoted as d12, the distance between the power-supplying resonator 22 and the power-receiving resonator 32 is denoted as d23, and the distance between the power-receiving resonator 32 and the power-receiving coil 31 is denoted as d34 (see FIG. 1).

Further, as shown in FIG. 4, a mutual inductance between the coil $L_1$ of the power-supplying coil 21 and the coil $L_2$ of the power-supplying resonator 22 is $M_{12}$, a mutual inductance between the coil $L_2$ of the power-supplying resonator 22 and the coil $L_3$ of the power-receiving resonator 32 is $M_{23}$, and a mutual inductance between the coil $L_3$ of the power-receiving resonator 32 and the coil $L_4$ of the power-receiving coil 31 is $M_{34}$. Further, in the wireless power transmission apparatus 1, a coupling coefficient between the coil $L_1$ and the coil $L_2$ is denoted as $K_{12}$, a coupling coefficient between the coil $L_2$ and the coil $L_3$ is denoted as $K_{23}$, and a coupling coefficient between the coil $L_3$ and the coil $L_4$ is denoted as $K_{34}$.

FIG. 4 shows at its bottom a circuit diagram of the wireless power transmission apparatus 1 (including: the stabilizer circuit 7, the charging circuit 8, and the secondary battery 9). In the figure, the entire power-supplying module 2 and the power-receiving module 3 (the stabilizer circuit 7, the charging circuit 8, and the secondary battery 9) structuring the wireless power transmission apparatus 1 is shown as a single input impedance $Z_{in}$. Further, the voltage applied to the wireless power transmission apparatus 1 is indicated as voltage $V_{in}$, and the current input to the wireless power transmission apparatus 1 is indicated as current $I_{in}$.

To be more specific about the input impedance $Z_{in}$ of the wireless power transmission apparatus 1, the structure of the wireless power transmission apparatus 1 is expressed in an equivalent circuit as shown in FIG. 4. Based on the equivalent circuit in FIG. 4, the input impedance $Z_{in}$ of the wireless power transmission apparatus 1 is expressed as the (Formula 2).

$$Z_{in} = Z_1 + \cfrac{(\omega M_{12})^2}{Z_2 + \cfrac{(\omega M_{23})^2}{Z_3 + \cfrac{(\omega M_{34})^2}{Z_4 + Z_L}}} \quad \text{(Formula 2)}$$

$$M_{12} = k_{12}\sqrt{L_1 L_2}$$
$$M_{23} = k_{23}\sqrt{L_2 L_3}$$
$$M_{34} = k_{34}\sqrt{L_3 L_4}$$

($k_{ij}$ is a coupling coefficient between $L_i$ and $L_j$)

Further, the impedance $Z_1$, $Z_2$, $Z_3$, $Z_4$, and $Z_L$ of the power-supplying coil 21, the power-supplying resonator 22, the power-receiving resonator 32, and the power-receiving coil 31 in the wireless power transmission apparatus 1 of the present embodiment are expressed as the (Formula 3).

$$Z_1 = R_1 + j\omega L_1 \quad \text{(Formula 3)}$$
$$Z_2 = R_2 + j\left(\omega L_2 - \frac{1}{\omega C_2}\right)$$
$$Z_3 = R_3 + j\left(\omega L_3 - \frac{1}{\omega C_3}\right)$$
$$Z_4 = R_4 + j\omega L_4$$
$$Z_L = R_L$$

It should be noted that the resistance value, inductance, capacity of capacitor, and the coupling coefficients $K_{12}$, $K_{23}$, $K_{34}$ in the $R_1$ and $L_1$ of the RL circuit of the power-supplying coil 21, the $R_2$, $L_2$, and $C_2$ of the RLC circuit of the power-supplying resonator 22, the $R_3$, $L_3$, and $C_3$ of the RLC circuit of the power-receiving resonator 32, the $R_4$ and $L_4$ of the RL circuit of the power-receiving coil 31 are set as parameters variable at the stage of designing and manufacturing.

The phase detector 4 provided to the charger 101 detects an input impedance $Z_{in}$ of the wireless power transmission apparatus 1, and detects the phase of the input impedance $Z_{in}$ based on the input impedance $Z_{in}$ detected. For example, as the phase detector 4, a current detector and a voltage detector are used to detect the current $I_{in}$ input and the voltage $V_{in}$ applied to the wireless power transmission apparatus 1, respectively. Then the input impedance $Z_{in}$ is derived based on the voltage $V_{in}$ and the current $I_{in}$ (see Formula 4), and detects the phase of the input impedance $Z_{in}$ based on the input impedance $Z_{in}$ derived.

$$Z_{in} = \frac{V_{in}}{I_{in}} \quad \text{(Formula 4)}$$

For the need of reducing the power consumption in the wireless power transmission apparatus 1, the phase detector 4 preferably performs detection of the phase of the input impedance $Z_{in}$ at a predetermined time intervals, instead of performing the same all the time.

Although the control device 5 will be detailed later, it has a function of determining whether to perform power supply from the AC power source 6 to the power-supplying module 2, according to variation in the phase of the input impedance $Z_{in}$ detected by the phase detector 4. When the control device 5 determines not to perform power supply, it shuts off the power supply from the AC power source 6 to the power-supplying module 2. Specifically, a threshold value is set between the phase of the input impedance $Z_{in}$ in the power-supplying state and that in the standby state. Then, transition is made from the power-supplying state to the standby state (power supply from the AC power source 6 to the power-supplying module 2 is shut off), or from the standby state to the power-supplying state (power supply from the AC power source 6 to the power-supplying module 2 is started/resumed), when the input impedance $Z_{in}$ exceeds the threshold. It should be noted that the control device 5 is structured by, for example, a micro computer, storage device, and the like.

As shown in FIG. 1 and FIG. 4, the power-supplying state is a state where power is supplied from the power-supplying module 2 to the power-receiving module 3. This power-supplying state may be expressed as the period in which the power-supplying resonator 22 of the power-supplying module 2 and the power-receiving resonator 32 of the power-receiving module 3 are in a magnetic field resonant state. Further, the power-supplying state is a state where the distance d23 between the power-supplying resonator 22 and the power-receiving resonator 32 is such that the power-supplying resonator 22 and the power-receiving resonator 32 are closely disposed (within the power-suppliable region). In the present embodiment, the power-supplying state is a state in which the rechargeable battery 9 in the wireless headset 102 is being charged.

Figure 3:
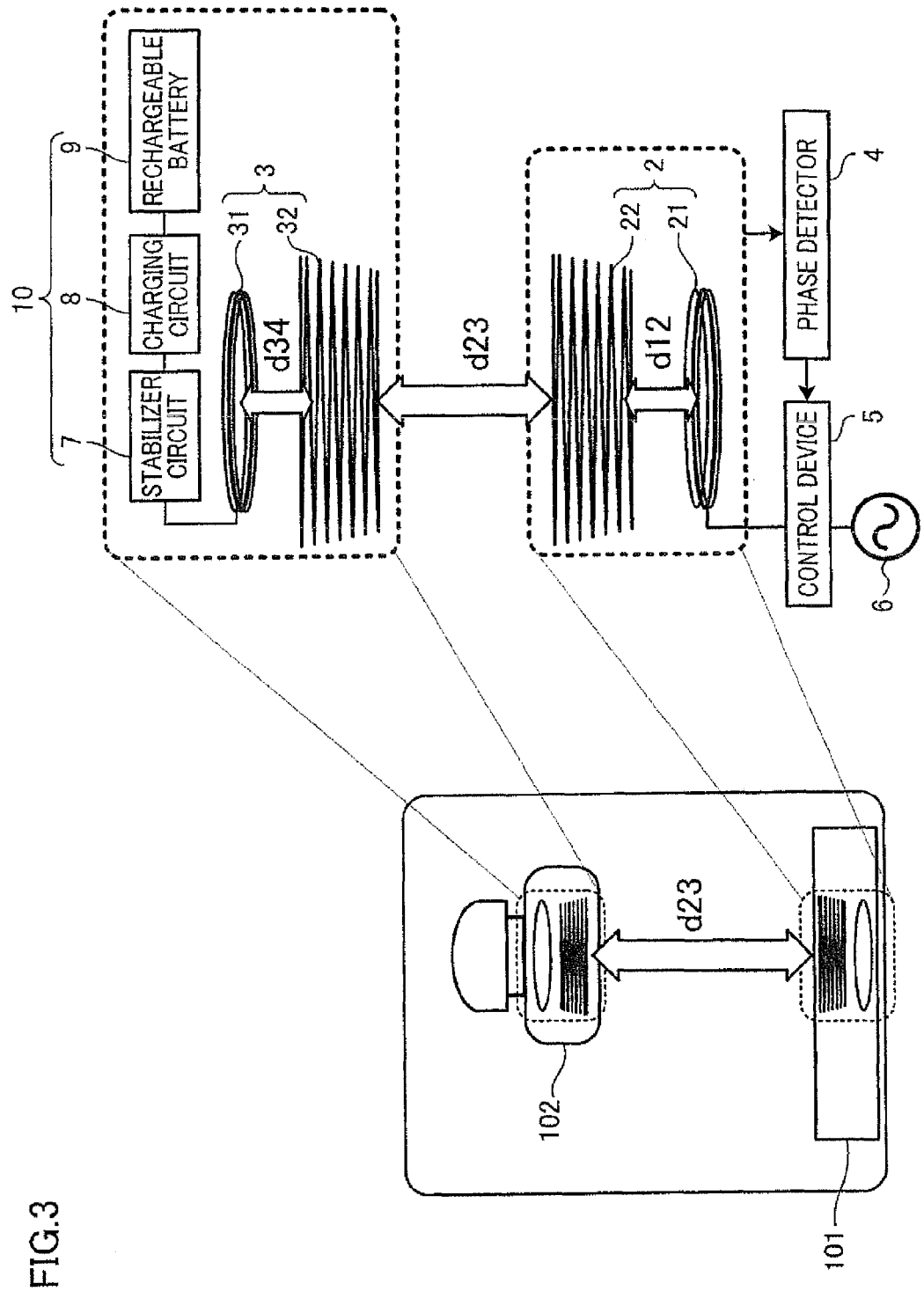
FIG. 3 is an explanatory diagram of the wireless power transmission apparatus in a standby state.
Figure 5:
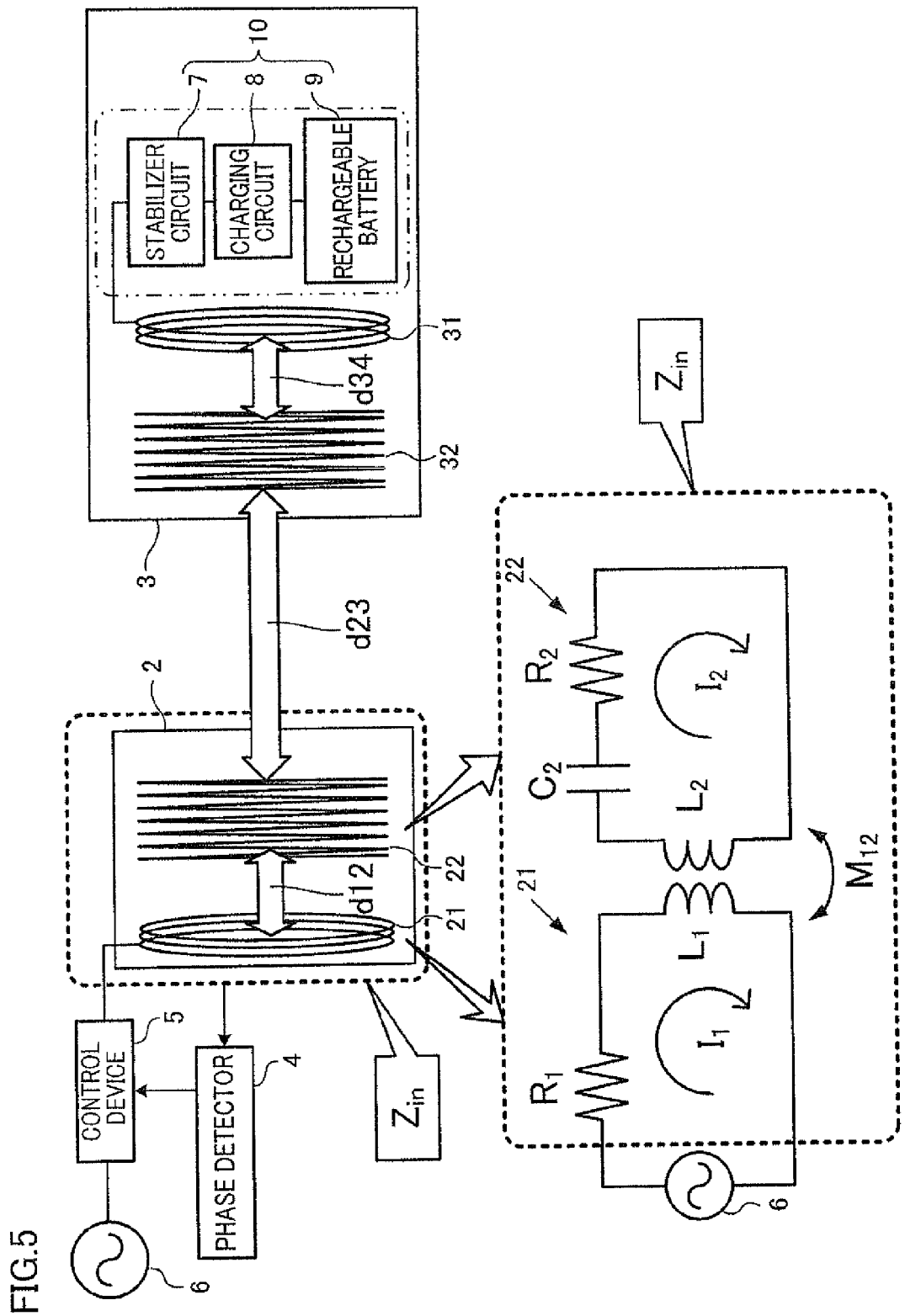
FIG. 5 is an explanatory diagram illustrating the wireless power transmission apparatus in the standby state, in the form of equivalent circuit.

On the other hand, as shown in FIG. 3 and FIG. 5, the standby state is a state where power is not supplied from the power-supplying module 2 to the power-receiving module 3. This standby state may be expressed as the period in which the power-supplying resonator 22 of the power-supplying module 2 and the power-receiving resonator 32 of the power-receiving module 3 are not in a magnetic field resonant state. Further, the standby state is a state where the distance d23 between the power-supplying resonator 22 and the power-receiving resonator 32 is such that the power-supplying resonator 22 and the power-receiving resonator 32 are disposed so that the magnetic field resonant state does not occur. In the present embodiment, the standby state is a state in which the rechargeable battery 9 in the wireless headset 102 is not being charged.

For example, where the phase of the input impedance $Z_{in}$ in the power-supplying state is 29 degrees, and that in the standby state is 88 degrees (see Example 1 below), the threshold is set at 58 degrees between these phases. When the value of the phase detected by the phase detector 4 changes from a low value (29 degrees) to a high value (88 degrees), beyond the threshold value of 58 degrees, the control device 5 determines there has been a transition from the power-supplying state to the standby state, and shuts off the power supply from the AC power source 6 to the power-supplying module 2. On the other hand, when the value of the phase detected by the phase detector 4 changes from the high value (88 degrees) to the low value (29 degrees), over the threshold value of 58 degrees, the control device 5 determines there has been a transition from the standby state to the power-supplying state, and starts/resumes the power supply from the AC power source 6 to the power-supplying module 2.

With the wireless power transmission apparatus 1, when the resonance frequency of the power-supplying resonator 22 and the resonance frequency of the power-receiving resonator 32 match with each other, a magnetic field resonant state is created between the power-supplying resonator 22 and the power-receiving resonator 32. When a magnetic field resonant state is created between the power-supplying resonator 22 and the power-receiving resonator 32 by having these resonators resonating with each other, power is transmitted from the power-supplying resonator 22 to the power-receiving resonator 32 as magnetic field energy. If the power supply from the AC power source 6 to the power-supplying module 2 is allowed by the control device 5. the power is transmitted wirelessly from the charger 101 having the power-supplying module 2 to the wireless headset 102 having the power-receiving module 3, and the rechargeable battery 9 in the wireless headset 102 is charged.

(Needs of Preventing Wasteful Power Consumption in Standby State)

Next, based on the concept of the standby state and the power-supplying state described above, the following describes the needs of preventing the wasteful power consumption in the standby state, in the power transmission by means of the wireless power transmission. To perform wireless power transmission by coupling magnetic fields utilizing resonance phenomenon (magnetic field resonant state) between the power-supplying resonator 22 and the power-receiving resonator 32 of the power-supplying module 2 and the power-receiving module 3, the power-receiving module 3 needs to be brought close to the power-supplying module 2 so that they are within a distance (power-suppliable region) that enables power supplying from the power-supplying module 2 to the power-receiving module 3 (see FIG. 1 and FIG. 4). In this process of use, power is continuously supplied to the power-supplying module, even if the power-supplying module and the power-receiving module are not within the power-suppliable region (standby state), so as to prepare for placement of the power-receiving module within the power-suppliable region (power-supplying state).

As the result, power consumption in the power-supplying module 2 in the standby state is wasted.

For this reason, there is a need of shutting off the power supply from the AC power source 6 to the power-supplying module 2 in the standby state.

In the structure of the present embodiment, the wireless power transmission apparatus 1 is set so that there will be a difference in the phase of the input impedance $Z_{in}$ to wireless power transmission apparatus 1 in the power-supplying state and that in the standby state, and that when the state is determined as to be the standby state based on the difference in the phase, power supply from the AC power source 6 to the power-supplying module 2 is shut off.

(Setting of Difference in Phase of Input Impedance $Z_{in}$)

To realize the setting that causes a difference between the phase of the input impedance $Z_{in}$ to the wireless power transmission apparatus 1 in the power-supplying state and the phase of the input impedance $Z_{in}$ to the wireless power transmission apparatus 1 in the standby state, the present embodiment adopts a setting such that the transmission characteristic "S21" of the wireless power transmission apparatus 1 with respect to the power-source frequency of the power supplied to the wireless power transmission apparatus 1 has a double-hump characteristic. To realize the wireless power transmission apparatus 1 having a double-hump characteristic, the resistance value, inductance, capacity of capacitor, and the coupling coefficients $K_{12}$, $K_{23}$, $K_{34}$ in the $R_1$ and $L_1$ of the RL circuit of the power-supplying coil 21, the $R_2$, $L_2$ and $C_2$ of the RLC circuit of the power-supplying resonator 22, the $R_3$, $L_3$, and $C_3$ of the RLC circuit of the power-receiving resonator 32, the $R_4$ and $L_4$ of the RL circuit of the power-receiving coil 31 are adjusted.

(Double-Hump Characteristic)

The transmission characteristic "S21" is signals measured by a network analyzer (E5061B produced by Agilent Technologies, Inc. and the like) connected to the power-supplying module 2 and the power-receiving module 3, and is indicated in decibel. The greater the value, the higher the power transmission efficiency. The transmission characteristic "S21" relative to the power-source frequency of the power supplied to the power-supplying module 2 and the power-receiving module 3 may have either single-hump or double-hump characteristic, depending on the strength of coupling (magnetic coupling) by the magnetic field between the power-supplying module 2 and the power-receiving module 3. The single-hump characteristic means the transmission characteristic "S21" relative to the power-source frequency has a single peak which occurs in the resonance frequency band (f0) (See dotted line 51 FIG. 6). The double-hump characteristic on the other hand means the transmission characteristic "S21" relative to the power-source frequency has two peaks, one of the peaks occurring in a power-source frequency band lower than the resonance frequency (fL), and the other occurring in a power-source frequency band higher than the resonance frequency (fH) (See solid line 52 in FIG. 6). The double-hump characteristic, to be more specific, means that the reflection characteristic "S11" measured with the network analyzer connected to the power-supplying module 2 and the power-receiving module 3 has two peaks. Therefore, even if the transmission characteristic "S21" relative to the power-source frequency appears to have a single peak, the transmission characteristic "S21" has a double-hump characteristic if the reflection characteristic "S11" measured has two peaks.

Figure 6:
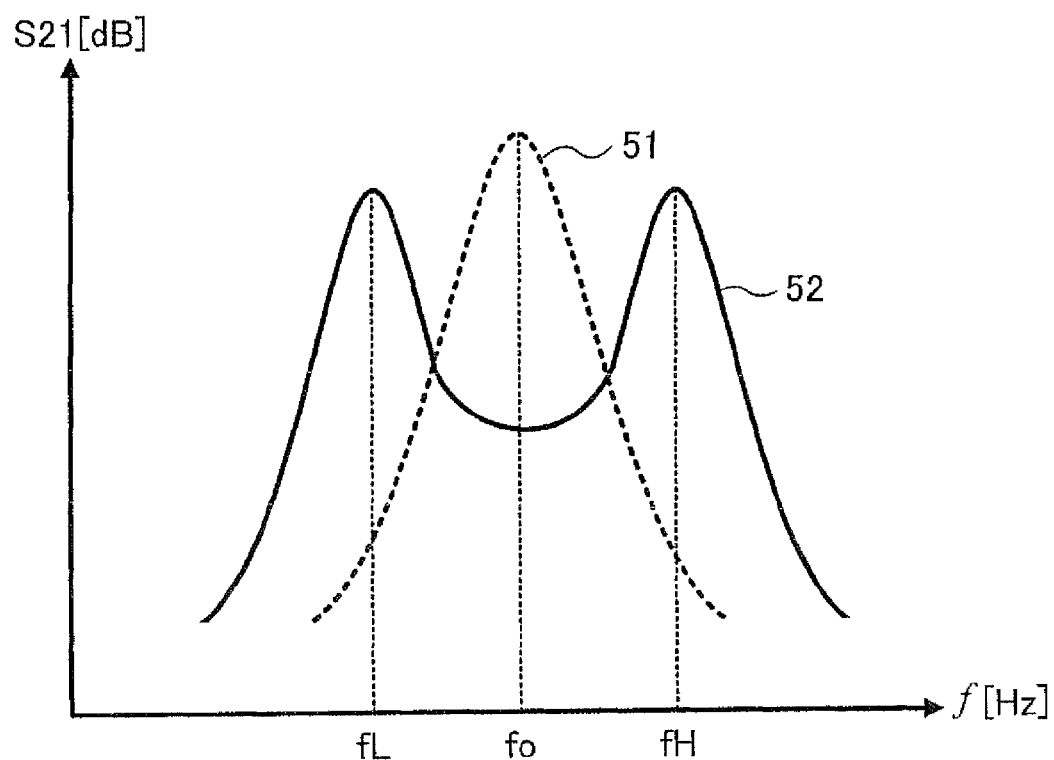
FIG. 6 is an explanatory diagram indicating relation of transmission characteristic "S21" to a power-source frequency.

In a wireless power transmission apparatus 1 (the power-supplying module 2 and the power-receiving module 3) having the single-hump characteristic, the transmission characteristic "S21" is maximized (power transmission efficiency is maximized) when the power-source frequency is at the resonance frequency $f_0$, as indicated by the dotted line 51 of FIG. 6.

On the other hand, in the wireless power transmission apparatus 1 (the power-supplying module 2 and the power-receiving module 3) having a double-hump characteristic, the transmission characteristic "S21" is maximized in a power-source frequency band (fL) lower than the resonance frequency fo, and in power-source frequency band (fH) higher than the resonance frequency fo, as indicated by the solid line 52 of FIG. 6.

It should be noted that, in general, if the distance between a power-supplying resonator 22 and a power-receiving resonator is the same, the maximum value of the transmission characteristic "S21" having the double-hump characteristic (the value of the transmission characteristic "S21" at fL or fH) is lower than the value of the maximum value of the transmission characteristic "S21" having the single-hump characteristic (value of the transmission characteristic "S21" at $f_0$) (See graph in FIG. 6).

For example, when the transmission characteristic "S21" indicates a double-hump characteristic, if the power-source frequency of the AC power supplied to the power-supplying module 2 is set to frequency band nearby a peak (fL) occurring in a lower frequency band than the resonance frequency fo, the power-supplying resonator 22 and the power-receiving resonator 32 are resonant with each other in inphase, and the current in the power-supplying resonator 22 and the current in the power-receiving resonator 32 both flow in the same direction. As the result, as shown in the graph of FIG. 6, the value of the transmission characteristic "S21" is made relatively high (see solid line 52), even if the power-source frequency does not match with the resonance frequency of the power-supplying resonator 22 and the power-receiving resonator 32, although the value still may not be as high as that of the transmission characteristic "S21" in wireless power transmission apparatuses in general aiming at maximizing the power transmission efficiency (see dotted line 51). Note that the resonance state in which the current in the power-supplying resonator 22 and the current in the power-receiving resonator 32 both flow in the same direction is referred to as inphase resonance mode.

Further, in the inphase resonance mode, because the magnetic field generated on the outer circumference side of the power-supplying resonator 22 and the magnetic field generated on the outer circumference side of the power-receiving resonator 32 cancel each other out, the magnetic field spaces each having a lower magnetic field strength than the magnetic field strengths in positions not on the outer circumference sides of the power-supplying resonator 22 and the power-receiving resonator 32 (e.g., the magnetic field strengths on the inner circumference sides of the power-supplying resonator 22 and the power-receiving resonator 32) are formed on the outer circumference sides of the power-supplying resonator 22 and the power-receiving resonator 32, as the influence of the magnetic fields is lowered. When a stabilizer circuit 7, a charging circuit 8, a rechargeable battery 9, and the like desired to have less influence of the magnetic field is placed in this magnetic field space, occurrence of Eddy Current attributed to the magnetic field is restrained or prevented. This restrains negative effects due to generation of heat.

On the other hand, for example, when the transmission characteristic "S21" indicates a double-hump characteristic, if the power-source frequency of the AC power supplied to the power-supplying module 2 is set to frequency band nearby a peak (fH) occurring in a higher frequency band than the resonance frequency fo, the power-supplying resonator 22 and the power-receiving resonator 32 are resonant with each other in antiphase, and the current in the power-supplying resonator 22 and the current in the power-receiving resonator 32 flow in directions opposite to each other. As the result, as shown in the graph of FIG. 6, the value of the transmission characteristic "S21" is made relatively high (see solid line 52), even if the power-source frequency does not match with the resonance frequency of the power-supplying resonator 22 and the power-receiving resonator 32, although the value still may not be as high as that of the transmission characteristic "S21" in wireless power transmission apparatuses in general aiming at maximizing the power transmission efficiency (see dotted line 51). Note that the resonance state in which the current in the power-supplying resonator 22 and the current in the power-receiving resonator 32 flow in directions opposite to each other is referred to as antiphase resonance mode.

Further, in the antiphase resonance mode, because the magnetic field generated on the inner circumference side of the power-supplying resonator 22 and the magnetic field generated on the inner circumference side of the power-receiving resonator 32 cancel each other out, the magnetic field spaces each having a lower magnetic field strength than the magnetic field strengths in positions not on the inner circumference side of the power-supplying resonator 22 and the power-receiving resonator 32 (e.g., the magnetic field strengths on the outer circumference side of the power-supplying resonator 22 and the power-receiving resonator 32) are formed on the outer circumference sides of the power-supplying resonator 22 and the power-receiving resonator 32, as the influence of the magnetic fields is lowered. When a stabilizer circuit 7, a charging circuit 8, a rechargeable battery 9, and the like desired to have less influence of the magnetic field is placed in this magnetic field space, occurrence of Eddy Current attributed to the magnetic field is restrained or prevented. This restrains negative effects due to generation of heat. Further, since the magnetic field space formed in this antiphase resonance mode is formed on the inner circumference side of the power-supplying resonator 22 and the power-receiving resonator 32, assembling the electronic components such as the stabilizer circuit 7, the charging circuit 8, the rechargeable battery 9, and the like within this space makes the power-supplying module 2 and the power-receiving module 3 themselves more compact, and improves the freedom in designing.

COMPARATIVE EXAMPLES AND EXAMPLES

To realize the setting that causes a difference between the phase of the input impedance $Z_{in}$ to the wireless power transmission apparatus 1 in the power-supplying state and the phase of the input impedance $Z_{in}$ to the wireless power transmission apparatus 1 in the standby state, the following describes, with reference to comparative examples and examples, a setting is preferably such that the transmission characteristic "S21" of the wireless power transmission apparatus 1 with respect to the power-source frequency of the power supplied to the wireless power transmission apparatus 1 has a double-hump characteristic. Using the power-supplying module 2 and the power-receiving module 3 of various settings, the following comparative examples and examples shows analyses results of an input impedance $Z_{in}$ with respect to the power-source frequency in the standby state (Off), an input impedance $Z_{in}$ with respect to the power-source frequency in the power-supplying state (On), the phase of the input impedance $Z_{in}$ with respect to the power-source frequency in the standby state (Off), and the phase of the input impedance $Z_{in}$ with respect to the power-source frequency in the power-supplying state (On). It should be noted that the analyses were conducted with a variable resister 11 ($R_1$) substituting for the stabilizer circuit 7, the charging circuit 8, and the rechargeable battery 9, in the following comparative examples and examples.

Further, the analysis in Comparative Example 1 deals with a case where the transmission characteristic "S21" with respect to the power-source frequency of the power to the power-supplying module 2 and the power-receiving module 3 in the power-supplying state has a single-hump characteristic. Further, the analyses in Comparative Example 2 and Examples 1 to 4 deal with a case where the transmission characteristic "S21" with respect to the power-source frequency of the power to the power-supplying module 2 and the power-receiving module 3 in the power-supplying state has a double-hump characteristic.

Comparative Example 1

As shown in FIG. 4, a power-supplying module 2 of the wireless power transmission apparatus 1 related to Comparative Example 1 includes a power-supplying coil 21 and a power-supplying resonator 22. On the other hand, the power-receiving module 3 includes a power-receiving resonator 32 and a power-receiving coil 31. The values of $R_1$, $R_2$, $R_3$, $R_4$ in the wireless power transmission apparatus 1 used in Comparative Example 1 are all set to 0.50. Further, the values of $L_1$, $L_2$, $L_3$, $L_4$ were set to 4.5 µH. The $R_L$ of the power-supplied electronic devices 10 was 100Ω. The resonance frequency of the power-supplying resonator 22 and that of the power-receiving resonator 32 was 1.0 MHz. The coupling coefficients $K_{12}$ and $K_{34}$ were 0.3, and the coupling coefficient $K_{23}$ was 0.03 (it should be noted that these are values of coupling coefficients in the power-supplying state). Further, as mentioned above, the wireless power transmission apparatus 1 relative to Comparative example 1 has a single-hump characteristic.

In the standby state, the input impedance of the power-supplying coil 21 and the power-supplying resonator 22 constituting the power-supplying module 2 was $Z_{in}$, as shown in FIG. 5. In the power-supplying state, the input impedance of the power-supplying coil 21 and the power-supplying resonator 22 constituting the power-supplying module 2 and that of the power-receiving resonator 32 and the power-receiving coil 31 constituting the power-receiving module 3 were $Z_{in}$, as shown in FIG. 4.

Figure 7A:
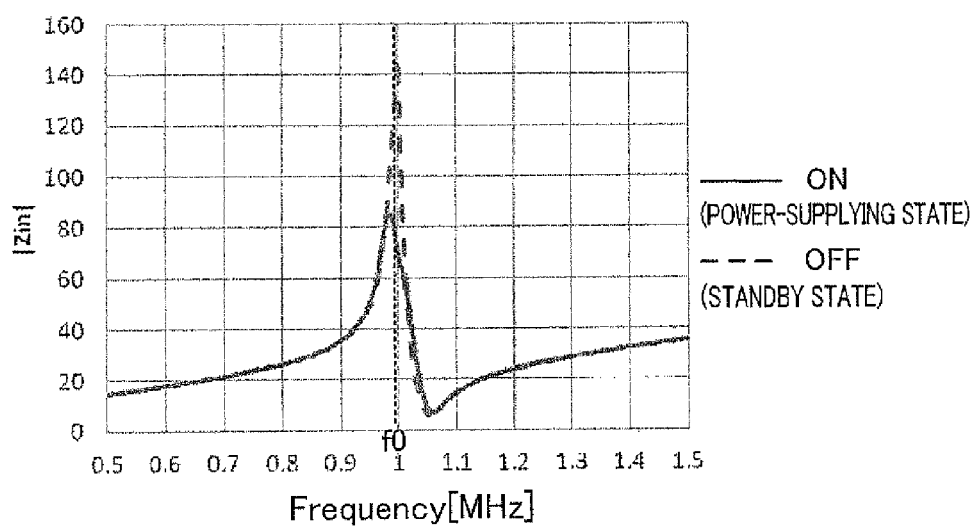
FIG. 7(A) is a graph related to Comparative example 1, showing analysis results of the input impedance $Z_{in}$ with respect to the power-source frequencies in the standby state and the power-supplying state.

In relation to the wireless power transmission apparatus 1 in Comparative Example 1, FIG. 7(A) shows analysis results of the input impedance $Z_{in}$ with respect to the power-source frequency of the power in the standby state (Off: Broken line in FIG. 7(A)) and the input impedance $Z_{in}$ with respect to the power-source frequency of the power in the power-supplying state (On: solid line in FIG. 7(A)). From the results, it is understood that the input impedance $Z_{in}$ is maximized both in the standby state and the power-supplying state, by setting the power-source frequency to the resonance frequency fo (1 MHz: maximizing the power transmission efficiency).

Figure 7B:
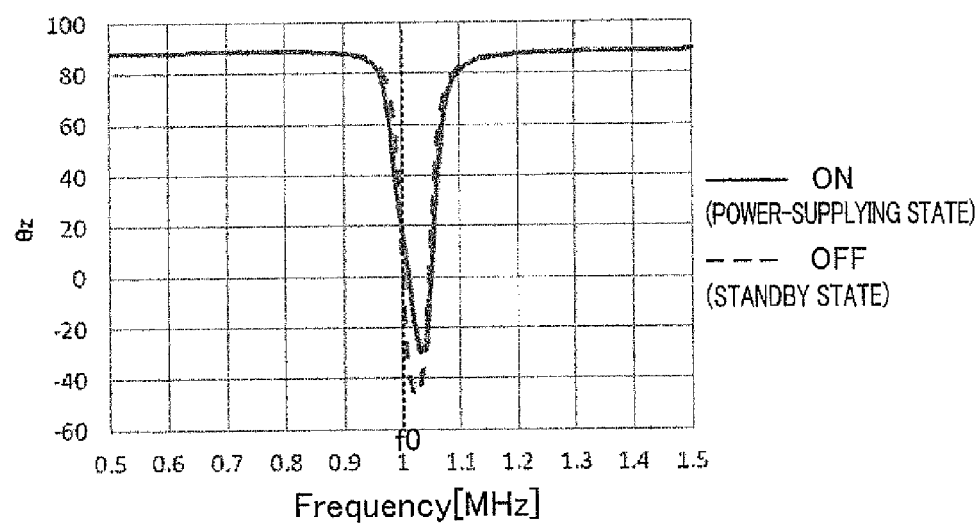
FIG. 7(B) is a graph related to Comparative example 1, showing analysis results of the phase of the input impedance $Z_{in}$ with respect to the power-source frequencies in the standby state and the power-supplying state.

In relation to the wireless power transmission apparatus 1 in Comparative Example 1, FIG. 7(B) shows analysis results of the phase of the input impedance $Z_{in}$ with respect to the power-source frequency of the power in the standby state (Off: Broken line in FIG. 7(B)) and the phase of the input impedance $Z_{in}$ with respect to the power-source frequency of the power in the power-supplying state (On: solid line in FIG. 7(B)). According to the results, with the wireless power transmission apparatus 1 having a single-hump characteristic, the phase of the input impedance $Z_{in}$ in the power-supplying state (On) was 19 degrees, and that in the standby state (Off) was 11 degrees, at the resonance frequency fo that maximizes the power transmission efficiency. In this case, it is understood that, although there is a slight difference between the phase of the input impedance $Z_{in}$ in the power-supplying state and that in the standby state, the difference is small and is not suitable for use in determination by the control device 5. Technically speaking, since there is a slight difference between the phase of the input impedance $Z_{in}$ in the power-supplying state and that in the standby state, it is possible to detect this difference. However, since the difference in the phases is small, detecting such a difference necessitates a highly accurate detector and a highly accurate control device (to prevent malfunctions). Therefore, the above case is not preferable in terms of the cost performance related to the wireless power transmission apparatus 1.

Example 1

As shown in FIG. 4, a power-supplying module 2 of the wireless power transmission apparatus 1 related to Example 1 includes a power-supplying coil 21 and a power-supplying resonator 22, as in the case of Comparative Example 1. Further, similarly to Comparative Example 1, the power-receiving module 3 includes a power-receiving resonator 32 and a power-receiving coil 31. The coupling coefficient $K_{23}$ in the wireless power transmission apparatus 1 used in Example 1 is set to 0.3Ω (the rest of the settings are the same as Comparative Example 1). With the setting of the coupling coefficient $K_{23}$ to 0.3, the wireless power transmission apparatus 1 related to Example 1 is set to have a double-hump characteristic.

In the standby state, the input impedance of the power-supplying coil 21 and the power-supplying resonator 22 constituting the power-supplying module 2 was $Z_{in}$, as shown in FIG. 5. In the power-supplying state, the input impedance of the power-supplying coil 21 and the power-supplying resonator 22 constituting the power-supplying module 2 and that of the power-receiving resonator 32 and the power-receiving coil 31 constituting the power-receiving module 3 were $Z_{in}$, as shown in FIG. 4.

Figure 8A:
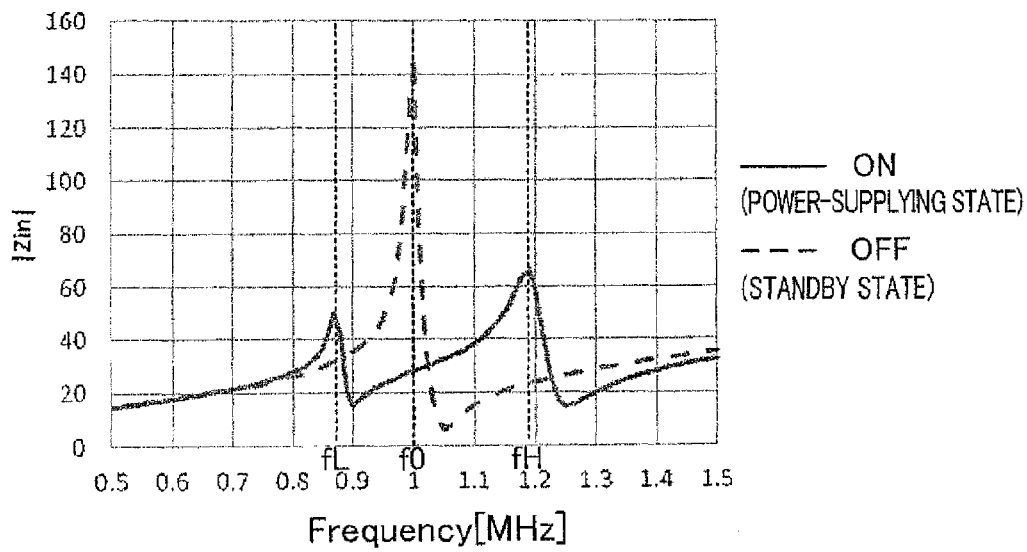
FIG. 8(A) is a graph related to Example 1, showing analysis results of the input impedance $Z_{in}$ with respect to the power-source frequencies in the standby state and the power-supplying state.

In relation to the wireless power transmission apparatus 1 in Example 1, FIG. 8(A) shows analysis results of the input impedance $Z_{in}$ with respect to the power-source frequency of the power in the standby state (Off: Broken line in FIG. 8(A)) and the input impedance $Z_{in}$ with respect to the power-source frequency of the power in the power-supplying state (On: solid line in FIG. 8(A)). From the results, it is understood that the peak occurs at the power-source frequency to become the inphase resonance mode (fL: 0.88 MHz) or the antiphase resonance mode (fH: 1.19 MHz), in the power-supplying state.

Figure 8B:
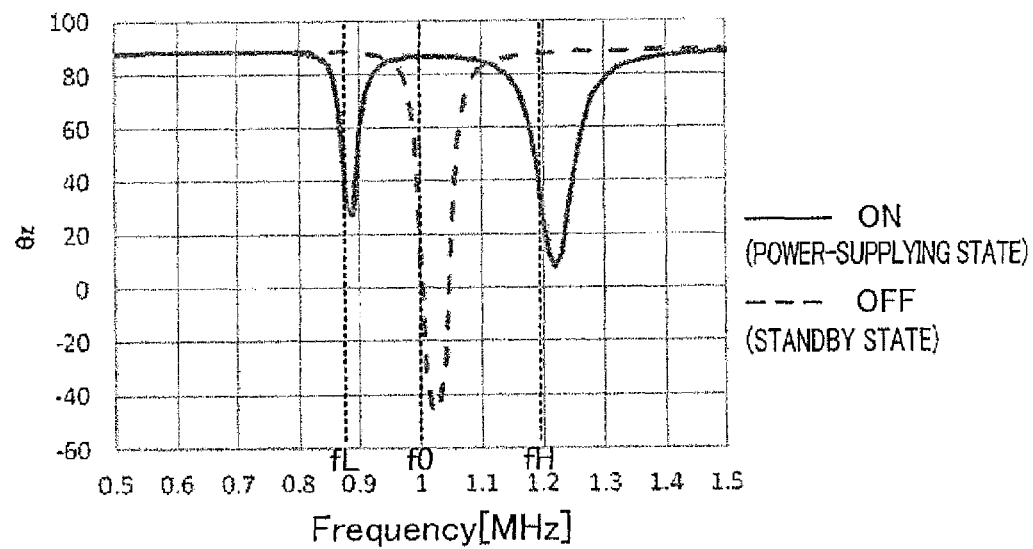
FIG. 8(B) is a graph related to Example 1, showing analysis results of the phase of the input impedance $Z_{in}$ with respect to the power-source frequencies in the standby state and the power-supplying state.

In relation to the wireless power transmission apparatus 1 in Example 1, FIG. 8(B) shows analysis results of the phase of the input impedance $Z_{in}$ with respect to the power-source frequency of the power in the standby state (Off: Broken line in FIG. 8(B)) and the phase of the input impedance $Z_{in}$ with respect to the power-source frequency of the power in the power-supplying state (On: solid line in FIG. 8(B)).

According to the results, with the wireless power transmission apparatus 1 having a double-hump characteristic, the phase of the input impedance $Z_{in}$ in the power-supplying state (On) was 29 degrees, and that in the standby state (Off) was 88 degrees, in the inphase resonance mode (fL) that maximizes the power transmission efficiency. In this case, the difference between the phase of the input impedance $Z_{in}$ in the power-supplying state and that in the standby state is 59 degrees. Thus, when the threshold value is set to 58 degrees, for example, there will be a large difference (29 degrees) between the threshold value (58 degrees) and the phase (29 degrees) of input impedance $Z_{in}$ in the power-supplying state (On). Therefore, the control device 5 is able to accurately cause a transition from the power-supplying state to the standby state (a small difference in the phases likely causes incorrect detection; i.e., there will be variation and the like of the detected values of phases, due to the accuracy of the phase detector 4). Similarly, there will be a large difference (a difference of 30 degrees) in the threshold value (58 degrees) and the phase (88 degrees) of the input impedance $Z_{in}$ in the standby state (off), the control device 5 is able to accurately cause a transition from the standby state to the power-supplying state.

Since the difference between the phase of the input impedance $Z_{in}$ in the power-supplying state and that in the standby state is large, there is no need of adopting a highly accurate phase detector 4 or a highly accurate control device 5. Therefore, the above-structure is preferable in terms of cost performance of the wireless power transmission apparatus 1.

Meanwhile, with the wireless power transmission apparatus 1 having a double-hump characteristic, the phase of the input impedance $Z_{in}$ in the power-supplying state (On) was 26 degrees, and that in the standby state (Off) was 87 degrees, in the antiphase resonance mode (fH) that maximizes the power transmission efficiency. In this case, the difference between the phase of the input impedance $Z_{in}$ in the power-supplying state and that in the standby state is 61 degrees. Therefore, as in the case of the inphase resonance mode, the control device 5 is able to accurately cause transition from the power-supplying state to the standby state.

Comparative Example 2

Figure 9:
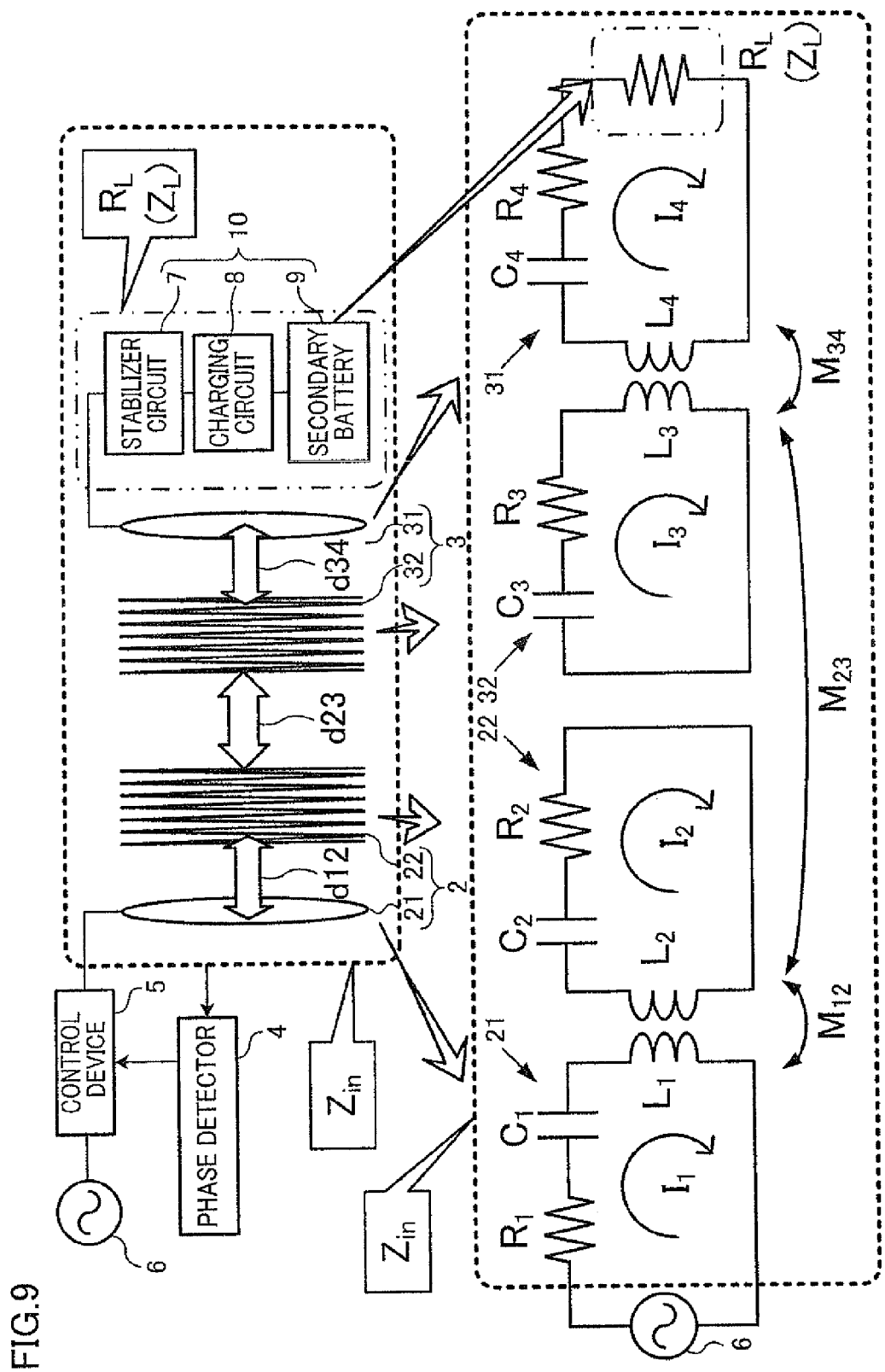
FIG. 9 is an explanatory diagram illustrating wireless power transmission apparatuses related to Comparative example 2 and Example 2, in the form of equivalent circuit.

In the wireless power transmission apparatus 1 related to Comparative Example 2, the power-supplying coil 21 of the power-supplying module 2 was constituted by an RLC serial circuit whose elements include a resistor $R_1$, a coil $L_1$, and a capacitor $C_1$ as shown in FIG. 9, and the power-receiving coil 31 of the power-receiving module 3 was constituted by an RLC serial circuit whose elements include a resistor $R_4$, a coil $L_4$, and a capacitor $C_4$. The other structures are the same as those in Example 1. The resonance frequency (f1) of the power-supplying coil 21, and the resonance frequency (f4) of the power-receiving coil 31 were both 1.0 MHz. The resonance frequency (f0) of the power-supplying resonator 22 and that of the power-receiving resonator 32 were 1.0 MHz (f1=f0). Further, the coupling coefficients $K_{12}$, $K_{23}$, $K_{34}$ were set to 0.3 ($K_{12}=K_{23}$). Further, the wireless power transmission apparatus 1 relative to Comparative example 2 is set to have a double-hump characteristic.

In the standby state, the input impedance of the power-supplying coil 21 and the power-supplying resonator 22 constituting the power-supplying module 2 was $Z_{in}$. In the power-supplying state, the input impedance of the power-supplying coil 21 and the power-supplying resonator 22 constituting the power-supplying module 2 and that of the power-receiving resonator 32 and the power-receiving coil 31 constituting the power-receiving module 3 were $Z_{in}$, as shown in FIG. 9.

Figure 10A:
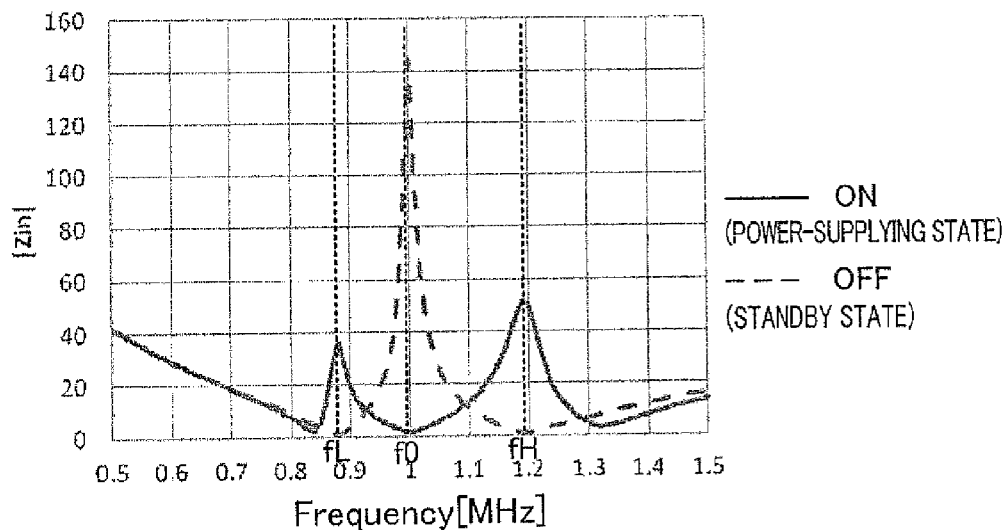
FIG. 10(A) is a graph related to Comparative example 2, showing analysis results of the input impedance $Z_{in}$ with respect to the power-source frequencies in the standby state and the power-supplying state.

In relation to the wireless power transmission apparatus 1 in Comparative Example 2, FIG. 10(A) shows analysis results of the input impedance $Z_{in}$ with respect to the power-source frequency of the power in the standby state (Off: Broken line in FIG. 10(A)) and the input impedance $Z_{in}$ with respect to the power-source frequency of the power in the power-supplying state (On: solid line in FIG. 10(A)). From the results, it is understood that the peak occurs at the power-source frequency to become the inphase resonance mode (fL: 0.88 MHz) or the antiphase resonance mode (fH: 1.19 MHz), in the power-supplying state.

Figure 10B:
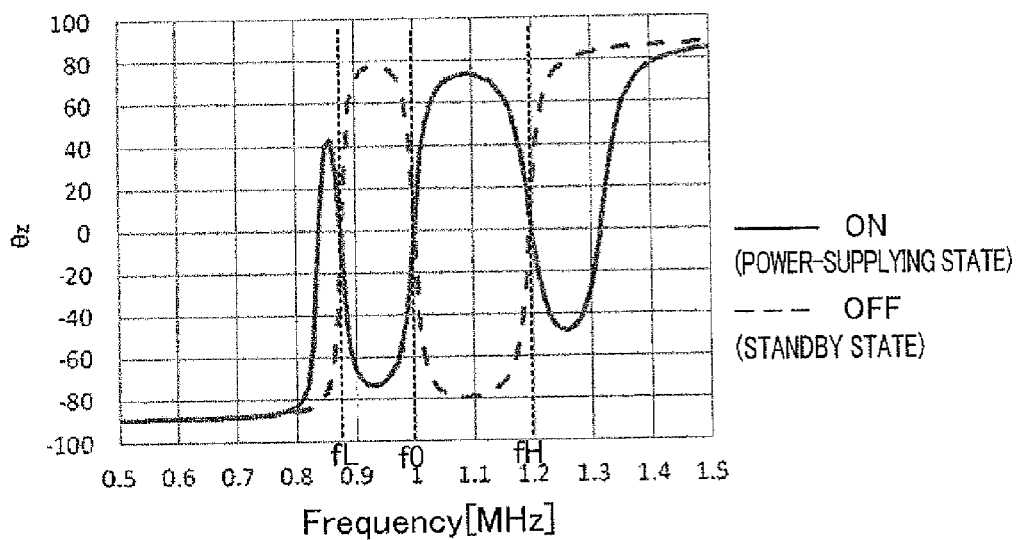
FIG. 10(B) is a graph related to Comparative example 2, showing analysis results of the phase of the input impedance $Z_{in}$ with respect to the power-source frequencies in the standby state and the power-supplying state.

In relation to the wireless power transmission apparatus 1 in Comparative Example 2, FIG. 10(B) shows analysis results of the phase of the input impedance $Z_{in}$ with respect to the power-source frequency of the power in the standby state (Off: Broken line in FIG. 10(B)) and the phase of the input impedance $Z_{in}$ with respect to the power-source frequency of the power in the power-supplying state (On: solid line in FIG. 10(B)).

According to the results, with the wireless power transmission apparatus 1 having a double-hump characteristic, the phase of the input impedance $Z_{in}$ in the power-supplying state (On) was 0 degree, and that in the standby state (Off) was 0 degree, in the inphase resonance mode (fL) that maximizes the power transmission efficiency. In this case, there is no difference between the phase of the input impedance $Z_{in}$ in the power-supplying state and that in the standby state. Meanwhile, with the wireless power transmission apparatus 1 having a double-hump characteristic, the phase of the input impedance $Z_{in}$ in the power-supplying state (On) was 0 degree, and that in the standby state (Off) was 0 degree, in the antiphase resonance mode (fH) that maximizes the power transmission efficiency. In this case, there is no difference between the phase of the input impedance $Z_{in}$ in the power-supplying state and that in the standby state. As should be understood, there will be no difference between the phase of the input impedance $Z_{in}$ in the power-supplying state and that in the standby state neither in the inphase resonance mode nor in the antiphase resonance mode, when the power-supplying coil 21 of the power-supplying module 2 is constituted by an RLC serial circuit whose elements include a resistor $R_1$, a coil $L_1$, and a capacitor $C_1$, the coupling coefficient is set so as to satisfy $K_{12}=K_{23}$, and the resonance frequency (f1) of the power-supplying coil 21 and the resonance frequency (f0) of the power-supplying resonator 22 and the power-receiving resonator 32 is set so as to satisfy the relation of f1=f0.

In view of the above, there is a need of setting to cause a difference between the phase of the input impedance $Z_{in}$ in the power-supplying state and that in the standby state both in the inphase resonance mode and the antiphase resonance mode, even when the power-supplying coil 21 of the power-supplying module 2 is constituted by an RLC serial circuit whose elements include a resistor $R_1$, a coil $L_1$, and a capacitor $C_1$. Such a setting is described in Examples 2 to 4 below.

Example 2

Similarly to Comparative Example 2, in the wireless power transmission apparatus 1 related to Example 2, the power-supplying coil 21 of the power-supplying module 2 was constituted by an RLC serial circuit whose elements include a resistor $R_1$, a coil $L_1$, and a capacitor $C_1$ as shown in FIG. 9, and the power-receiving coil 31 of the power-receiving module 3 is constituted by an RLC serial circuit whose elements include a resistor $R_4$, a coil $L_4$, and a capacitor $C_4$. Further, in Example 2, the coupling coefficient $K_{12}$ was set to 0.2, and the coupling coefficients $K_{23}$ and $K_{34}$ were set to 0.3 ($K_{12} \neq K_{23}$). The resonance frequency (f1) of the power-supplying coil 21, and the resonance frequency (f4) of the power-receiving coil 31 were both 1.0 MHz. The resonance frequency (f0) of the power-supplying resonator 22 and that of the power-receiving resonator 32 were 1.0 MHz (f1=f0). Further, the wireless power transmission apparatus 1 relative to Example 2 is set to have a double-hump characteristic, as in the case of Comparative Example 2.

In the standby state, the input impedance of the power-supplying coil 21 and the power-supplying resonator 22 constituting the power-supplying module 2 was $Z_{in}$. In the power-supplying state, the input impedance of the power-supplying coil 21 and the power-supplying resonator 22 constituting the power-supplying module 2 and that of the power-receiving resonator 32 and the power-receiving coil 31 constituting the power-receiving module 3 were $Z_{in}$, as shown in FIG. 9.

Figure 11A:
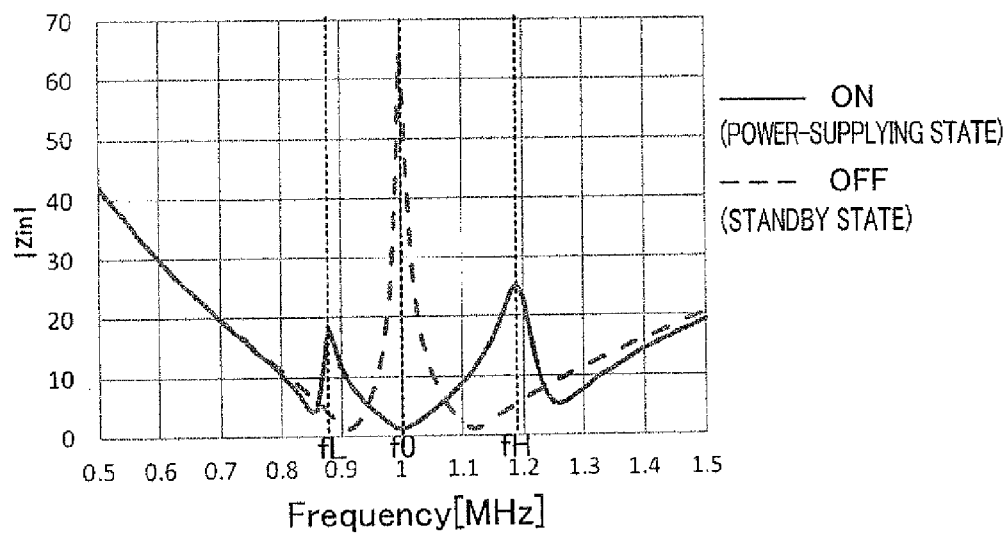
FIG. 11(A) is a graph related to Example 2, showing analysis results of the input impedance $Z_{in}$ with respect to the power-source frequencies in the standby state and the power-supplying state.

In relation to the wireless power transmission apparatus 1 in Example 2, FIG. 11(A) shows analysis results of the input impedance $Z_{in}$ with respect to the power-source frequency of the power in the standby state (Off: Broken line in FIG. 11(A)) and the input impedance $Z_{in}$ with respect to the power-source frequency of the power in the power-supplying state (On: solid line in FIG. 11(A)). From the results, it is understood that the peak occurs at the power-source frequency to become the inphase resonance mode (fL: 0.88 MHz) or the antiphase resonance mode (fH: 1.19 MHz), in the power-supplying state.

Figure 11B:
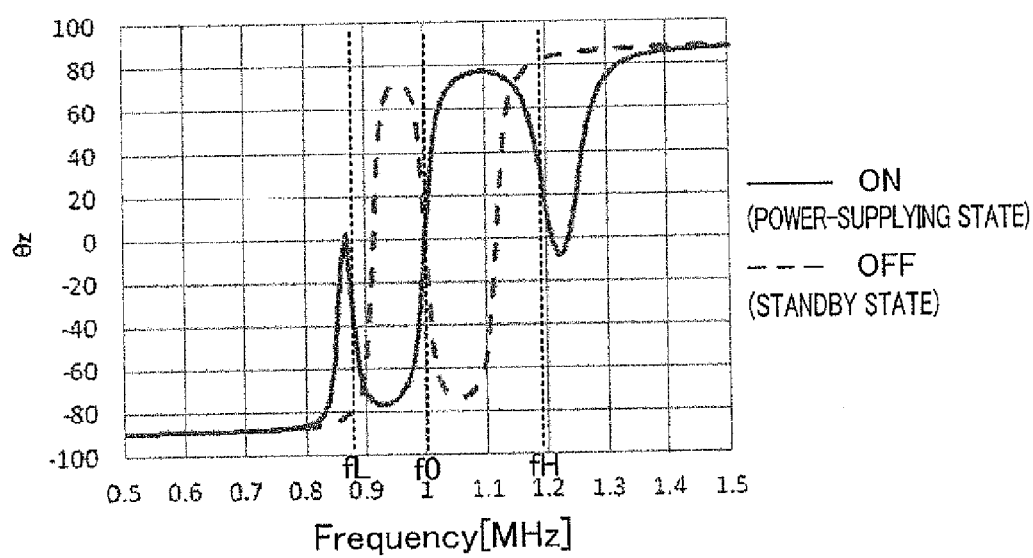
FIG. 11(B) is a graph related to Example 2, showing analysis results of the phase of the input impedance $Z_{in}$ with respect to the power-source frequencies in the standby state and the power-supplying state.

In relation to the wireless power transmission apparatus 1 in Example 2, FIG. 11(B) shows analysis results of the phase of the input impedance $Z_{in}$ with respect to the power-source frequency of the power in the standby state (Off: Broken line in FIG. 11(B)) and the phase of the input impedance $Z_{in}$ with respect to the power-source frequency of the power in the power-supplying state (On: solid line in FIG. 11(B)).

According to the results, with the wireless power transmission apparatus 1 having a double-hump characteristic, the phase of the input impedance $Z_{in}$ in the power-supplying state (On) was −33 degrees, and that in the standby state (Off) was −79 degrees, in the inphase resonance mode (fL) that maximizes the power transmission efficiency. In this case, the difference between the phase of the input impedance $Z_{in}$ in the power-supplying state and that in the standby state is 46 degrees. Thus, for example, if the threshold value is set to −56 degrees, there will be a large difference (a difference of 23 degrees) between the threshold value (−56 degrees) and the phase (−33 degrees) of the input impedance $Z_{in}$ of the power-supplying state (ON). Therefore, the control device 5 is able to accurately cause a transition from the power-supplying state to the standby state. Similarly, there will be a large difference (a difference of 23 degrees) in the threshold value (−56 degrees) and the phase (−79 degrees) of the input impedance $Z_{in}$ in the standby state (off), the control device 5 is able to accurately cause a transition from the standby state to the power-supplying state.

Since the difference between the phase of the input impedance $Z_{in}$ in the power-supplying state and that in the standby state is large, there is no need of adopting a highly accurate phase detector 4 or a highly accurate control device 5. Therefore, the above-structure is preferable in terms of cost performance of the wireless power transmission apparatus 1.

Meanwhile, with the wireless power transmission apparatus 1 having a double-hump characteristic, the phase of the input impedance $Z_{in}$ in the power-supplying state (On) was 30 degrees, and that in the standby state (Off) was 82 degrees, in the antiphase resonance mode (fH) that maximizes the power transmission efficiency. In this case, the difference between the phase of the input impedance $Z_{in}$ in the power-supplying state and that in the standby state is 52 degrees. Therefore, as in the case of the inphase resonance mode, the control device 5 is able to accurately cause transition from the power-supplying state to the standby state.

Example 3

Similarly to Example 2, in the wireless power transmission apparatus 1 related to Example 3, the power-supplying coil 21 of the power-supplying module 2 was constituted by an RLC serial circuit whose elements include a resistor $R_1$, a coil $L_1$, and a capacitor $C_1$ as shown in FIG. 9, and the power-receiving coil 31 of the power-receiving module 3 is constituted by an RLC serial circuit whose elements include a resistor $R_4$, a coil $L_4$, and a capacitor $C_4$. Further, in Example 3, the coupling coefficient $K_{12}$ was set to 0.2, and the coupling coefficients $K_{23}$ and $K_{34}$ were set to 0.3 ($K_{12} \neq K_{23}$). The resonance frequency (f1) of the power-supplying coil 21, and the resonance frequency (f4) of the power-receiving coil 31 were both 0.9 MHz. The resonance frequency (f0) of the power-supplying resonator 22 and that of the power-receiving resonator 32 were 1.0 MHz (f1≠f0). Further, the wireless power transmission apparatus 1 relative to Example 3 is set to have a double-hump characteristic, as in the case of Example 2.

In the standby state, the input impedance of the power-supplying coil 21 and the power-supplying resonator 22 constituting the power-supplying module 2 was $Z_{in}$. In the power-supplying state, the input impedance of the power-supplying coil 21 and the power-supplying resonator 22 constituting the power-supplying module 2 and that of the power-receiving resonator 32 and the power-receiving coil 31 constituting the power-receiving module 3 were $Z_{in}$, as shown in FIG. 9.

Figure 12A:
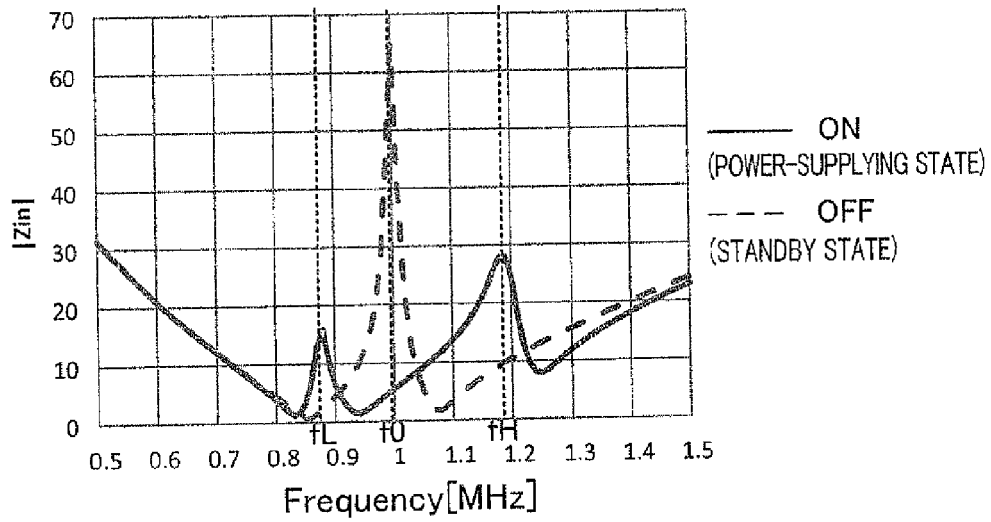
FIG. 12(A) is a graph related to Example 3, showing analysis results of the input impedance $Z_{in}$ with respect to the power-source frequencies in the standby state and the power-supplying state.

In relation to the wireless power transmission apparatus 1 in Example 3, FIG. 12(A) shows analysis results of the input impedance $Z_{in}$ with respect to the power-source frequency of the power in the standby state (Off: Broken line in FIG. 12(A)) and the input impedance $Z_{in}$ with respect to the power-source frequency of the power in the power-supplying state (On: solid line in FIG. 12(A)). From the results, it is understood that the peak occurs at the power-source frequency to become the inphase resonance mode (fL: 0.88 MHz) or the antiphase resonance mode (fH: 1.19 MHz), in the power-supplying state.

Figure 12B:
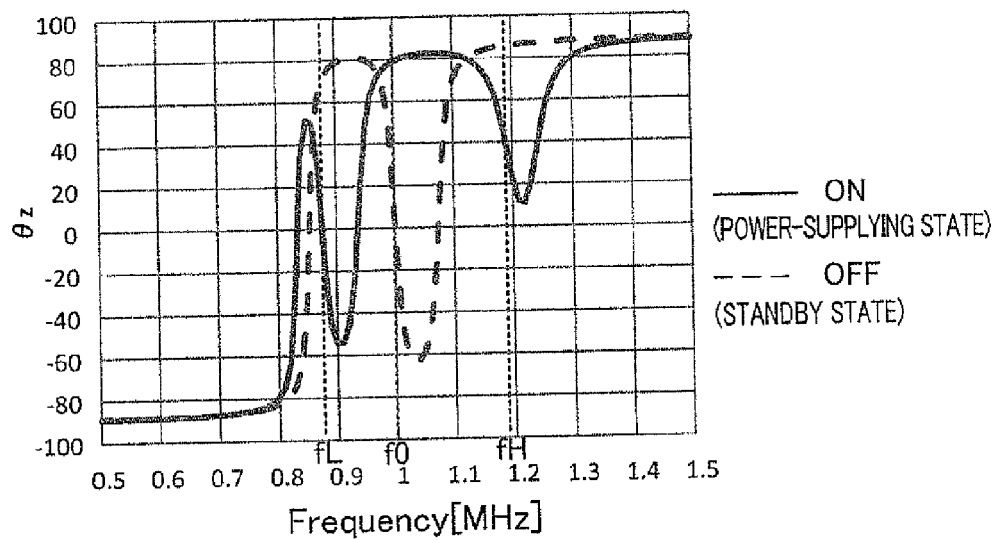
FIG. 12(B) is a graph related to Example 3, showing analysis results of the phase of the input impedance $Z_{in}$ with respect to the power-source frequencies in the standby state and the power-supplying state.

In relation to the wireless power transmission apparatus 1 in Example 3, FIG. 12(B) shows analysis results of the phase of the input impedance $Z_{in}$ with respect to the power-source frequency of the power in the standby state (Off: Broken line in FIG. 12(B)) and the phase of the input impedance $Z_{in}$ with respect to the power-source frequency of the power in the power-supplying state (On: solid line in FIG. 12(B)).

According to the results, with the wireless power transmission apparatus 1 having a double-hump characteristic, the phase of the input impedance $Z_{in}$ in the power-supplying state (On) was −15 degrees, and that in the standby state (Off) was +72 degrees, in the inphase resonance mode (fL) that maximizes the power transmission efficiency. In this case, the difference between the phase of the input impedance $Z_{in}$ in the power-supplying state and that in the standby state is 87 degrees. Thus, for example, if the threshold value is set to +29 degrees, there will be a large difference (a difference of 44 degrees) between the threshold value (+29 degrees) and the phase (−15 degrees) of the input impedance $Z_{in}$ of the power-supplying state (ON). Therefore, the control device 5 is able to accurately cause a transition from the power-supplying state to the standby state. Similarly, there will be a large difference (a difference of 43 degrees) in the threshold value (29 degrees) and the phase (72 degrees) of the input impedance $Z_{in}$ in the standby state (off), the control device 5 is able to accurately cause a transition from the standby state to the power-supplying state.

Since the difference between the phase of the input impedance $Z_{in}$ in the power-supplying state and that in the standby state is large, there is no need of adopting a highly accurate phase detector 4 or a highly accurate control device 5. Therefore, the above-structure is preferable in terms of cost performance of the wireless power transmission apparatus 1.

Meanwhile, with the wireless power transmission apparatus 1 having a double-hump characteristic, the phase of the input impedance $Z_{in}$ in the power-supplying state (On) was 38 degrees, and that in the standby state (Off) was 86 degrees, in the antiphase resonance mode (fH) that maximizes the power transmission efficiency. In this case, the difference between the phase of the input impedance $Z_{in}$ in the power-supplying state and that in the standby state is 48 degrees. Therefore, as in the case of the inphase resonance mode, the control device 5 is able to accurately cause transition from the power-supplying state to the standby state.

Example 4

Similarly to Example 2, in the wireless power transmission apparatus 1 related to Example 4, the power-supplying coil 21 of the power-supplying module 2 was constituted by an RLC serial circuit whose elements include a resistor $R_1$, a coil $L_1$, and a capacitor $C_1$ as shown in FIG. 9, and the power-receiving coil 31 of the power-receiving module 3 is constituted by an RLC serial circuit whose elements include a resistor $R_4$, a coil $L_4$, and a capacitor $C_4$. Further, in Example 4, the coupling coefficients $K_{12}$, $K_{23}$, and $K_{34}$ were all set to 0.3 ($K_{12}=K_{23}$). The resonance frequency (f1) of the power-supplying coil 21, and the resonance frequency (f4) of the power-receiving coil 31 were both 0.9 MHz. The resonance frequency (f0) of the power-supplying resonator 22 and that of the power-receiving resonator 32 were 1.0 MHz (f1≠f0). Further, the wireless power transmission apparatus 1 relative to Example 4 is set to have a double-hump characteristic, as in the case of Example 2.

In the standby state, the input impedance of the power-supplying coil 21 and the power-supplying resonator 22 constituting the power-supplying module 2 was $Z_{in}$. In the power-supplying state, the input impedance of the power-supplying coil 21 and the power-supplying resonator 22 constituting the power-supplying module 2 and that of the power-receiving resonator 32 and the power-receiving coil 31 constituting the power-receiving module 3 were $Z_{in}$, as shown in FIG. 9.

Figure 13A:
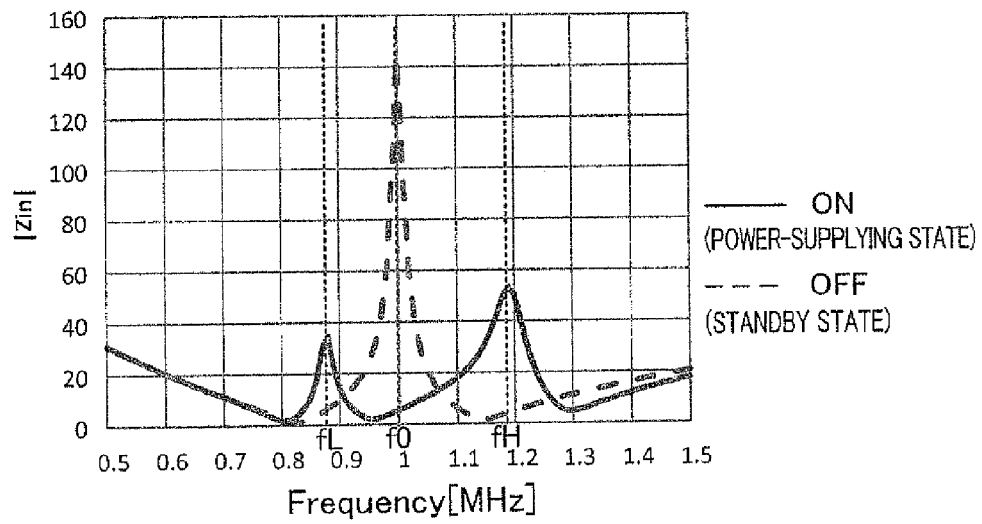
FIG. 13(A) is a graph related to Example 4, showing analysis results of the input impedance $Z_{in}$ with respect to the power-source frequencies in the standby state and the power-supplying state.

In relation to the wireless power transmission apparatus 1 in Example 4, FIG. 13(A) shows analysis results of the input impedance $Z_{in}$ with respect to the power-source frequency of the power in the standby state (Off: Broken line in FIG. 13(A)) and the input impedance $Z_{in}$ with respect to the power-source frequency of the power in the power-supplying state (On: solid line in FIG. 13(A)). From the results, it is understood that the peak occurs at the power-source frequency to become the inphase resonance mode (fL: 0.88 MHz) or the antiphase resonance mode (fH: 1.19 MHz), in the power-supplying state.

Figure 13B:
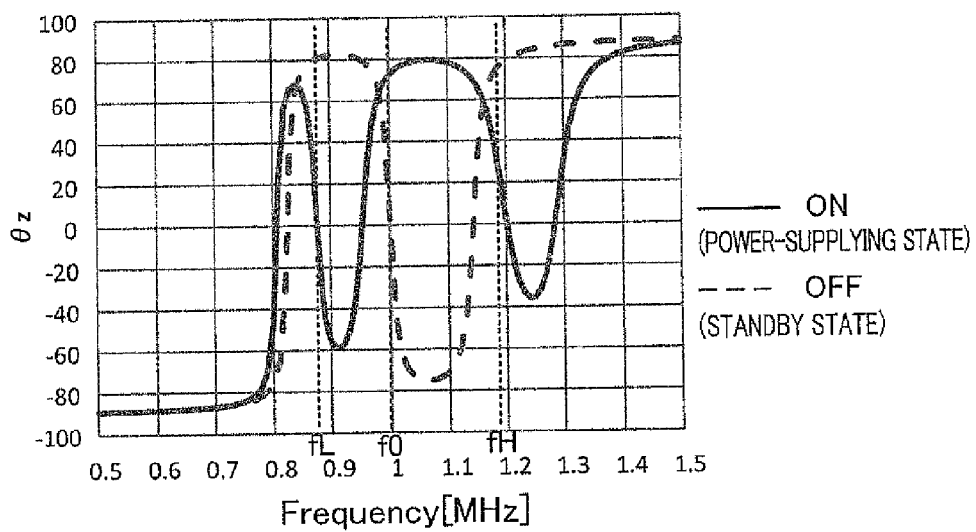
FIG. 13(B) is a graph related to Example 4, showing analysis results of the phase of the input impedance $Z_{in}$ with respect to the power-source frequencies in the standby state and the power-supplying state.

In relation to the wireless power transmission apparatus 1 in Example 4, FIG. 13(B) shows analysis results of the phase of the input impedance $Z_{in}$ with respect to the power-source frequency of the power in the standby state (Off: Broken line in FIG. 13(B)) and the phase of the input impedance $Z_{in}$ with respect to the power-source frequency of the power in the power-supplying state (On: solid line in FIG. 13(B)).

According to the results, with the wireless power transmission apparatus 1 having a double-hump characteristic, the phase of the input impedance $Z_{in}$ in the power-supplying state (On) was −13 degrees, and that in the standby state (Off) was +81 degrees, in the inphase resonance mode (fL) that maximizes the power transmission efficiency. In this case, the difference between the phase of the input impedance $Z_{in}$ in the power-supplying state and that in the standby state is 94 degrees. Thus, for example, if the threshold value is set to 34 degrees, there will be a large difference (a difference of 47 degrees) between the threshold value (34 degrees) and the phase (−13 degrees) of the input impedance $Z_{in}$ of the power-supplying state (ON). Therefore, the control device 5 is able to accurately cause a transition from the power-supplying state to the standby state. Similarly, there will be a large difference (a difference of 47 degrees) in the threshold value (34 degrees) and the phase (81 degrees) of the input impedance $Z_{in}$ in the standby state (off), the control device 5 is able to accurately cause a transition from the standby state to the power-supplying state.

Since the difference between the phase of the input impedance $Z_{in}$ in the power-supplying state and that in the standby state is large, there is no need of adopting a highly accurate phase detector 4 or a highly accurate control device 5. Therefore, the above-structure is preferable in terms of cost performance of the wireless power transmission apparatus 1.

Meanwhile, with the wireless power transmission apparatus 1 having a double-hump characteristic, the phase of the input impedance $Z_{in}$ in the power-supplying state (On) was 23 degrees, and that in the standby state (Off) was 76 degrees, in the antiphase resonance mode (fH) that maximizes the power transmission efficiency. In this case, the difference between the phase of the input impedance $Z_{in}$ in the power-supplying state and that in the standby state is 53 degrees. Therefore, as in the case of the inphase resonance mode, the control device 5 is able to accurately cause transition from the power-supplying state to the standby state.

As described in Comparative Example 2, there will be no difference between the phase of the input impedance $Z_{in}$ in the power-supplying state and that in the standby state neither in the inphase resonance mode nor in the antiphase resonance mode, when the power-supplying coil 21 of the power-supplying module 2 is constituted by an RLC serial circuit whose elements include a resistor $R_1$, a coil $L_1$, and a capacitor $C_1$, the coupling coefficient is set so as to satisfy a relation of $K_{12}=K_{23}$, and the resonance frequency (f1) of the power-supplying coil 21 and the resonance frequency (f0) of the power-supplying resonator 22 and the power-receiving resonator 32 is set so as to satisfy the relation of f1=f0.

However, as should be understood from Example 2 and Example 3, it is possible to achieve a setting to cause a difference between the phase of the input impedance $Z_{in}$ in the power-supplying state and that in the standby state both in the inphase resonance mode and the antiphase resonance mode, even when the power-supplying coil 21 is constituted by an RLC serial circuit, as long as the coupling coefficient $K_{12}$ between the coil $L_1$ and the coil $L_2$ and the coupling coefficient $K_{23}$ between the coil $L_2$ and the coil $L_3$ satisfies a relation of $K_{12} \neq K_{23}$.

Further, as should be understood from Example 3 and Example 4, it is possible to achieve a setting to cause a difference between the phase of the input impedance $Z_{in}$ in the power-supplying state and that in the standby state both in the inphase resonance mode and the antiphase resonance mode, even when the power-supplying coil 21 is constituted by an RLC serial circuit, as long as the resonance frequency (f1) of the power-supplying coil 21 and the resonance frequency (f0) of the power-supplying resonator 22 and the power-receiving resonator 32 satisfies a relation of f1≠f0.

It should be noted that, as described in Example 3, it is also possible to achieve a setting to cause a difference between the phase of the input impedance $Z_{in}$ in the power-supplying state and that in the standby state both in the inphase resonance mode and the antiphase resonance mode, in cases where the power-supplying coil 21 is constituted by an RLC serial circuit and where the relation of $K_{12}=K_{23}$ and the relation of f1≠f0 are satisfied.

(Power Supply on/Off Switching Control: Power-Supply Operation Flow)

The following describes an operation of power supply (charging) the secondary battery 9 (supply power control method) using the wireless power transmission apparatus 1 having the structure described hereinabove. Specifically, the following mainly describes, with reference to FIG. 14, the power-supply operation flow executed by the control device 5 in the wireless power transmission apparatus 1. It should be noted that the following power-supply operation flow assumes that the setting the wireless power transmission apparatus 1 is that described in the above Example 1 (inphase resonance mode).

The wireless power transmission apparatus 1 of Example 1 has a double-hump characteristic, and the power-source frequency of the AC power source 6 is set so as to be in the inphase resonance mode (0.88 MHz). Further, with the wireless power transmission apparatus 1 of Example 1, the phase of the input impedance $Z_{in}$ in the power-supplying state (On) was 29 degrees, and that in the standby state (Off) was 88 degrees. The threshold value is set to a value (58 degrees) between the phase (29 degrees) of input impedance $Z_{in}$ in the power-supplying state (On) and the phase (88 degrees) of the input impedance $Z_{in}$ in the standby state.

First, the control device 5 receives the value of the phase of the input impedance $Z_{in}$ of the wireless power transmission apparatus 1, which is detected by the phase detector 4 (S1).

Specifically, a storage device in the control device 5 successively stores the values of the phase of the input impedance $Z_{in}$ of the wireless power transmission apparatus 1, which values are detected at predetermined intervals.

Next, the control device 5 determines if the value of the phase of the input impedance $Z_{in}$ of the wireless power transmission apparatus 1 detected in S1 exceeds the threshold value of 58 degrees (S2). Specifically, when the values of phases of the input impedance $Z_{in}$, which are taken at two time points, respectively, with a predetermined interval therebetween and which are successively stored in the step of S1, indicate a change from a value lower than the threshold of 58 degree to a value higher than the threshold, or a change from a value higher than the threshold to a value lower than the threshold, the control device 5 determines that the value of the phase of the input impedance $Z_{in}$ of the wireless power transmission apparatus 1 has changed to a value on the other side of the threshold of 58 degrees.

When the value of the phase of the input impedance $Z_{in}$ of the wireless power transmission apparatus 1 is not determined as to be changed to a value on the other side of the threshold of 58 degrees (S2: NO), the process returns to S1.

When the value of the phase of the input impedance $Z_{in}$ of the wireless power transmission apparatus 1 is determined as to be changed to a value on the other side of the threshold of 58 degrees (S2: YES), the control device 5 determines whether the values of phases of the input impedance $Z_{in}$, which are taken at two time points, respectively, with a predetermined interval therebetween and which are successively stored in the step of S1, indicate a change from a value lower than the threshold of 58 degree (i.e., power-supplying state) to a value higher than the threshold (i.e., standby state) (S3).

When it is determined that the values of phases of the input impedance $Z_{in}$, which are taken at two time points, respectively, with a predetermined interval therebetween and which are successively stored in the step of S1, indicate a change from a value lower than the threshold of 58 degree to a value higher than the threshold (S3: YES), the control device 5 determines that there was a transition from the power-supplying state to the standby state, and power supply from the AC power source 6 to the power-supplying module 2 is shut off (S4). In short, charging of the secondary battery 9 is ended. The flow ends thereafter.

On the other hand, when it is determined that the values of phases of the input impedance $Z_{in}$, which are taken at two time points, respectively, with a predetermined interval therebetween and which are successively stored in the step of S1, does not indicate a change from a value lower than the threshold of 58 degree to a value higher than the threshold (S3: NO), in other words, the values of the phases indicate a change from a value higher than the threshold to a value lower than the threshold, the control device 5 determines that there was a transition from the standby state to the power-supplying state, and power supply from the AC power source 6 to the power-supplying module 2 is started/resumed (S5). In short, charging of the secondary battery 9 is started/resumed. The flow ends thereafter.

(Effects)

With the structure and method described above, the wireless power transmission apparatus 1 (the power-supplying module 2 and the power-receiving module 3) are set so that the transmission characteristic "S21" of the power-supplying module and the power-receiving module has a double-hump characteristic, thus causing the peak values of the transmission characteristic to occur in a band other than the resonance frequency. This way, there is a difference between the phase of the input impedance $Z_{in}$ in the standby state and that in the power-supplying state, since the power-supplying module and the power-receiving module are used with the setting (the inphase resonance mode or the antiphase resonance mode) of the power-source frequency nearby the peak in a band other than the resonance frequency (f0). Further, the control device 5 determines whether to supply power to the power-supplying module 2, based on the difference in the phase detected by the phase detector 4, which enables reduction of power consumption in the standby state.

With the structure of Example 1, the power-supplying module 2 and the power-receiving module 3 include the power-supplying coil 21, the power-supplying resonator 22, the power-receiving resonator 32, and the power-receiving coil 31, respectively. Therefore, it is possible to structure the power-supplying coil 21 and the power-receiving coil 31, with a relatively simple RL circuit.

With the structure of Example 2, the power-supplying module 2 and the power-receiving module 3 include the power-supplying coil 21, the power-supplying resonator 22, the power-receiving resonator 32, and the power-receiving coil 31, respectively. Therefore, it is possible to structure the power-supplying coil 21 and the power-receiving coil 31, with an RLC circuit. As described, structuring the power-supplying coil 21 and the power-receiving coil 31 with an RLC circuit increases the number of factors variable in designing, and achieves higher freedom in designing (variable factors for enabling the transmission characteristic "S21" of the power-supplying module 2 and the power-receiving module 3 having a double-hump characteristic is increased).

Other Embodiments

Although the above description deals with a charger 101 and a wireless headset 102 as an example, the method is applicable to any devices having a rechargeable battery; e.g., tablet PCs, digital cameras, mobile phones, earphone-type music player, hearing aids, and sound collectors.

Further, in the above description deals with a case of a power-supplied electronic device 10 having a rechargeable battery 9; however, it is possible to adopt, as the power-supplied electronic devices 10, a machine that directly consumes power for its operation.

Further, although the above description assumes the power-supplying module 2 and the power-receiving module 3 are mounted in a portable electronic device, the use of such an apparatus is not limited to small devices. For example, with a modification to the specifications according to the required power amount, the power-supplying module 2 and the power-receiving module 3 are mountable to a relatively large system such as a wireless charging system in an electronic vehicle (EV), or to an even smaller device such as a wireless endoscope for medical use.

Although the above descriptions have been provided with regard to the characteristic parts so as to understand the present invention more easily, the invention is not limited to the embodiments and the examples as described above and can be applied to the other embodiments and examples, and the applicable scope should be construed as broadly as possible. Furthermore, the terms and phraseology used in the specification have been used to correctly illustrate the present invention, not to limit it. In addition, it will be understood by those skilled in the art that the other structures, systems, methods, and the like included in the spirit of the present invention can be easily derived from the spirit of the invention described in the specification. Accordingly, it should be considered that the present invention covers equivalent structures thereof without departing from the spirit and scope of the invention as defined in the following claims. In addition, it is required to sufficiently refer to the documents that have been already disclosed, so as to fully understand the objects and effects of the present invention.

REFERENCE SIGNS LIST

1: Wireless Power Transmission Apparatus
2: Power-Supplying Module
3: Power-Receiving Module
4: Phase detector
5: Control device
6: AC power source
7: Stabilizer Circuit
8: Charging Circuit
9: Rechargeable Battery
10: Power-Supplied Electronic Device
21: Power-Supplying Coil
22: Power-Supplying Resonator
31: Power-Receiving Coil
32: Power-Receiving Resonator
101: Charger
102: Wireless Headset

The invention claimed is:

1. A wireless power transmission apparatus configured to supply power from a power-supplying module connected to a power source to a power-receiving module by means of resonance phenomenon, wherein:
the power-supplying module includes
a phase detector configured to detect the phase of an input impedance, and
a control device configured to control power to be supplied to the power-supplying module;
wherein the power-supplying module and the power-receiving module are each set so that a transmission characteristic with respect to a power-source frequency of the power supplied to the power-supplying module has a double-hump characteristic such that a peak occurs in a power-source frequency band lower than a resonance frequency of the power-supplying module and the power-receiving module, and in a power-source frequency band higher than the resonance frequency; and
wherein the control device determines whether to supply power to the power-supplying module, based on a difference between phases of the input impedances in a standby state and in a power-supplying state, the standby state being a state in which power is not supplied from the power-supplying module to the power-receiving module, the power-supplying state being a state in which power is supplied from the power-supplying module to the power-receiving module, and the phases being detected by the phase detector.

2. The wireless power transmission apparatus, according to claim 1, wherein
the power-supplying module and the power-power-receiving module comprise a power-supplying coil, a power-supplying resonator, a power-receiving resonator, and a power-power-receiving coil, respectively,
the power-supplying coil is constituted by an RL circuit including a resistor $R_1$ and a coil $L_1$,
the power-supplying resonator is constituted by an RLC circuit whose elements include a resistor $R_2$, a coil $L_2$, and a capacitor $C_2$,
the power-receiving resonator is constituted by an RLC circuit whose elements include a resistor $R_3$, a coil $L_3$, and a capacitor $C_3$, and
the power-receiving coil is constituted by an RL circuit including a resistor $R_4$ and a coil $L_4$.

3. A supply power control method of a wireless power transmission apparatus configured to supply power from a power-supplying module connected to a power source to a power-receiving module by means of resonance phenomenon, wherein the power-supplying module includes a phase detector configured to detect the phase of an input impedance, and a control device configured to control power to be supplied to the power-supplying module; wherein the power-supplying module and the power-receiving module are each set so that a transmission characteristic with respect to a power-source frequency of the power supplied to the power-supplying module has a double-hump characteristic such that a peak occurs in a drive frequency band lower than a resonance frequency of the power-supplying module and the power-receiving module, and in a drive frequency band higher than the resonance frequency, the method comprising the step of the control device determining whether to supply power to the power-supplying module, based on a difference between phases of the input impedances in a standby state and in a power-supplying state, the standby state being a state in which power is not supplied from the power-supplying module to the power-receiving module, the power-supplying state being a state in which power is supplied from the power-supplying module to the power-receiving module, and the phases being detected by the phase detector.

4. The wireless power transmission apparatus according to claim 1, wherein
the power-supplying module and the power-power-receiving module comprise a power-supplying coil, a power-supplying resonator, a power-receiving resonator, and a power-power-receiving coil, respectively,
the power-supplying coil is constituted by an RLC circuit including a resistor $R_1$, a coil $L_1$, and a capacitor $C_1$,
the power-supplying resonator is constituted by an RLC circuit whose elements include a resistor $R_2$, a coil $L_2$, and a capacitor $C_2$,
the power-receiving resonator is constituted by an RLC circuit whose elements include a resistor $R_3$, a coil $L_3$, and a capacitor $C_3$, and
the power-receiving coil is constituted by an RLC circuit whose elements include a resistor $R_4$, a coil $L_4$, and a capacitor $C_4$ wherein the power-supplying coil is an RLC serial circuit, at least one of relations $K_{12} \neq K_{23}$ and $f1 \neq f0$ is satisfied, where $K_{12}$ is a coupling coefficient between the coil $L_1$ and the coil $L_2$, $K_{23}$ is a coupling coefficient between the coil $L_2$ and the coil $L_3$, a $f1$ is a resonance frequency of the power-supplying coil, and $f0$ is a resonance frequency of the power-supplying resonator and the power-receiving resonator.

* * * * *